US009736209B2

(12) United States Patent
Austin-Lane

(10) Patent No.: US 9,736,209 B2
(45) Date of Patent: Aug. 15, 2017

(54) STATE CHANGE ALERTS MECHANISM

(75) Inventor: Christopher Emery Austin-Lane, Takoma Park, MD (US)

(73) Assignee: FACEBOOK, INC., Menlo Park, CA (US)

( * ) Notice: Subject to any disclaimer, the term of this patent is extended or adjusted under 35 U.S.C. 154(b) by 234 days.

(21) Appl. No.: 13/616,369

(22) Filed: Sep. 14, 2012

(65) Prior Publication Data

US 2013/0144938 A1    Jun. 6, 2013

Related U.S. Application Data

(63) Continuation of application No. 12/615,136, filed on Nov. 9, 2009, now Pat. No. 8,473,572, which is a continuation of application No. 09/624,192, filed on Jul. 24, 2000, now Pat. No. 7,624,172.

(60) Provisional application No. 60/195,989, filed on Apr. 7, 2000, provisional application No. 60/189,974, filed on Mar. 17, 2000.

(51) Int. Cl.
| | |
|---|---|
| *G06F 15/16* | (2006.01) |
| *G06F 13/00* | (2006.01) |
| *H04L 29/08* | (2006.01) |
| *H04L 12/58* | (2006.01) |
| *H04L 12/18* | (2006.01) |

(52) U.S. Cl.
CPC .......... *H04L 67/02* (2013.01); *H04L 12/1895* (2013.01); *H04L 12/581* (2013.01); *H04L 51/26* (2013.01); *H04L 67/26* (2013.01); *H04L 67/306* (2013.01)

(58) Field of Classification Search
CPC ............... H04L 29/08072; H04L 29/06; H04L 29/0809; H04L 29/08981; G06Q 30/02; H04N 5/44543; H04N 21/482; H04N 21/84; H04N 21/4821; H04N 21/4316
USPC ........................................................ 709/217
See application file for complete search history.

(56) References Cited

U.S. PATENT DOCUMENTS

| | | | |
|---|---|---|---|
| 4,028,496 | A | 6/1977 | LaMarche et al. |
| 4,650,927 | A | 3/1987 | James |
| 4,700,392 | A | 10/1987 | Kato et al. |
| 4,817,129 | A | 3/1989 | Riskin |
| 4,837,798 | A | 6/1989 | Cohen et al. |
| 4,975,657 | A | 12/1990 | Eastmond |
| 5,008,853 | A | 4/1991 | Bly et al. |
| 5,021,949 | A | 6/1991 | Morten et al. |

(Continued)

FOREIGN PATENT DOCUMENTS

| | | |
|---|---|---|
| CA | 2547240 | 12/2009 |
| CA | 2506417 | 6/2011 |

(Continued)

OTHER PUBLICATIONS

U.S. Appl. No. 12/615,136, filed Nov. 9, 2009, Austin-Lane.

(Continued)

*Primary Examiner* — Mahran Abu Roumi
(74) *Attorney, Agent, or Firm* — Keller Jolley Preece

(57) ABSTRACT

A communications system including one or more alert gates and an alert controller. Each alert gate is configured to detect a different type of alert feed corresponding to a particular kind of alert. The alert controller is connected to the alert gates and operable to receive detected alerts from the alert gates and to deliver the detected alerts to a user of the communications system.

113 Claims, 13 Drawing Sheets

(56) References Cited

U.S. PATENT DOCUMENTS

| | | |
|---|---|---|
| 5,025,252 A | 6/1991 | DeLuca et al. |
| 5,086,394 A | 2/1992 | Shapira |
| 5,101,424 A | 3/1992 | Clayto et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,428,778 A | 6/1995 | Brookes |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,557,659 A | 9/1996 | Hyde-Thomson |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,574,824 A | 11/1996 | Slyh et al. |
| 5,579,472 A | 11/1996 | Keyworth, II et al. |
| 5,590,133 A | 12/1996 | Billstrom et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,705,995 A | 1/1998 | Laflin et al. |
| 5,706,211 A | 1/1998 | Beletic et al. |
| 5,706,501 A | 1/1998 | Horikiri |
| 5,710,884 A | 1/1998 | Dedrick |
| 5,717,656 A | 2/1998 | Dourbal |
| 5,721,906 A | 2/1998 | Siefert |
| 5,724,567 A | 3/1998 | Rose et al. |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis |
| 5,760,771 A | 6/1998 | Blonder et al. |
| 5,761,196 A | 6/1998 | Ayerst et al. |
| 5,761,662 A | 6/1998 | Dasan |
| 5,764,916 A | 6/1998 | Busey et al. |
| 5,771,280 A | 6/1998 | Johnson et al. |
| 5,774,670 A | 6/1998 | Montulli |
| 5,774,673 A | 6/1998 | Beuk |
| 5,790,974 A | 8/1998 | Tognazzini |
| 5,793,365 A | 8/1998 | Tang et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,825,771 A | 10/1998 | Cohen et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,848,134 A | 12/1998 | Sekiguchi et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,893,091 A * | 4/1999 | Hunt ............... G06F 17/30867 |
| 5,893,099 A | 4/1999 | Schreiber et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,920,692 A | 7/1999 | Nguyen et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,950,200 A | 9/1999 | Sudai et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,978,842 A | 11/1999 | Noble et al. |
| 5,987,113 A | 11/1999 | James |
| 5,987,376 A | 11/1999 | Olson et al. |
| 5,991,791 A | 11/1999 | Siefert |
| 5,999,932 A | 12/1999 | Paul |
| 6,006,331 A | 12/1999 | Chu et al. |
| 6,009,413 A | 12/1999 | Webber et al. |
| 6,012,051 A | 1/2000 | Sammon, Jr. et al. |
| 6,014,429 A | 1/2000 | LaPorta et al. |
| 6,014,638 A | 1/2000 | Burge et al. |
| 6,020,884 A | 2/2000 | MacNaughton et al. |
| 6,021,433 A | 2/2000 | Payne et al. |
| 6,026,403 A | 2/2000 | Siefert |
| 6,026,429 A | 2/2000 | Jones et al. |
| 6,028,866 A | 2/2000 | Engel |
| 6,038,445 A | 3/2000 | Alperovich et al. |
| 6,038,451 A | 3/2000 | Syed et al. |
| 6,038,542 A | 3/2000 | Ruckdashel |
| 6,040,770 A | 3/2000 | Britton |
| 6,041,311 A | 3/2000 | Chislenko et al. |
| 6,049,533 A | 4/2000 | Norman et al. |
| 6,049,565 A | 4/2000 | Paradine et al. |
| 6,049,777 A | 4/2000 | Sheena et al. |
| 6,061,056 A | 5/2000 | Menard et al. |
| 6,064,723 A | 5/2000 | Cohn et al. |
| 6,064,976 A | 5/2000 | Tolopka |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,070,140 A | 5/2000 | Tran |
| 6,073,109 A | 6/2000 | Flores |
| 6,073,138 A | 6/2000 | de l'Etraz |
| 6,076,100 A | 6/2000 | Cottrille et al. |
| 6,078,740 A | 6/2000 | DeTreville et al. |

(56) References Cited

U.S. PATENT DOCUMENTS

| | | |
|---|---|---|
| 6,081,829 A | 6/2000 | Sidana |
| 6,081,830 A | 6/2000 | Schindler |
| 6,085,223 A | 7/2000 | Carino, Jr. et al. |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,094,681 A | 7/2000 | Shaffer et al. |
| 6,112,078 A | 8/2000 | Sormunen et al. |
| 6,112,181 A | 8/2000 | Shear |
| 6,115,455 A | 9/2000 | Picard |
| 6,115,605 A | 9/2000 | Siccardo et al. |
| 6,119,014 A | 9/2000 | Alperovich et al. |
| 6,128,603 A | 10/2000 | Dent et al. |
| 6,128,624 A | 10/2000 | Papierniak et al. |
| 6,128,739 A | 10/2000 | Fleming, III |
| 6,134,432 A | 10/2000 | Holmes et al. |
| 6,134,446 A | 10/2000 | Sasuta et al. |
| 6,134,582 A | 10/2000 | Kennedy |
| 6,138,146 A | 10/2000 | Moon et al. |
| 6,138,158 A | 10/2000 | Boyle et al. |
| 6,141,545 A | 10/2000 | Begeja et al. |
| 6,144,959 A | 11/2000 | Anderson |
| 6,148,197 A | 11/2000 | Bridges et al. |
| 6,148,328 A | 11/2000 | Cuomo et al. |
| 6,148,377 A | 11/2000 | Carter |
| 6,151,584 A | 11/2000 | Papierniak et al. |
| 6,157,618 A | 12/2000 | Boss et al. |
| 6,161,129 A | 12/2000 | Rochkind |
| 6,161,130 A | 12/2000 | Horvitz et al. |
| 6,166,730 A | 12/2000 | Goode et al. |
| 6,167,256 A | 12/2000 | Yla-Outinen |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,195,651 B1 | 2/2001 | Handel et al. |
| 6,195,657 B1 | 2/2001 | Rucker et al. |
| 6,198,738 B1 | 3/2001 | Chang et al. |
| 6,199,099 B1 | 3/2001 | Gershman et al. |
| 6,199,103 B1 | 3/2001 | Sakaguchi et al. |
| 6,208,996 B1 | 3/2001 | Ben-Shachar et al. |
| 6,212,175 B1 | 4/2001 | Harsch |
| 6,212,206 B1 | 4/2001 | Ketcham |
| 6,212,548 B1 | 4/2001 | DeSimone et al. |
| 6,212,550 B1 | 4/2001 | Segur |
| 6,219,413 B1 | 4/2001 | Burg |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,677 B1 | 7/2001 | Jain |
| 6,259,911 B1 | 7/2001 | Bims et al. |
| 6,260,148 B1 | 7/2001 | Aggarwal et al. |
| 6,269,369 B1 | 7/2001 | Robertson |
| 6,282,435 B1 | 8/2001 | Wagner et al. |
| 6,292,743 B1 | 9/2001 | Pu et al. |
| 6,292,825 B1 | 9/2001 | Chang et al. |
| 6,301,609 B1 | 10/2001 | Aravamudan et al. |
| 6,304,864 B1 | 10/2001 | Liddy et al. |
| 6,311,211 B1 | 10/2001 | Shaw |
| 6,317,831 B1 | 11/2001 | King |
| 6,324,541 B1 | 11/2001 | de l'Etraz et al. |
| 6,327,590 B1 | 12/2001 | Chidlovskii et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,761 B1 | 2/2002 | Cantone et al. |
| 6,351,777 B1 | 2/2002 | Simonoff |
| 6,360,251 B1 | 3/2002 | Fujita et al. |
| 6,360,252 B1 | 3/2002 | Rudy et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,377,931 B1 | 4/2002 | Shlomot |
| 6,381,594 B1 | 4/2002 | Eichstaedt et al. |
| 6,385,455 B1 | 5/2002 | St. Clair et al. |
| 6,385,619 B1 | 5/2002 | Eichstaedt et al. |
| 6,385,662 B1 | 5/2002 | Moon et al. |
| 6,389,032 B1 | 5/2002 | Cohen |
| 6,389,127 B1 | 5/2002 | Vardi et al. |
| 6,389,372 B1 | 5/2002 | Glance et al. |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,400,810 B1 | 6/2002 | Skladman et al. |
| 6,404,438 B1 | 6/2002 | Hatleid |
| 6,405,035 B1 | 6/2002 | Singh |
| 6,405,204 B1 | 6/2002 | Baker et al. |
| 6,408,282 B1 | 6/2002 | Buist |
| 6,415,318 B1 | 7/2002 | Aggarwal et al. |
| 6,418,203 B1 | 7/2002 | Marcie |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,424,996 B1 | 7/2002 | Killcommons et al. |
| 6,425,006 B1 * | 7/2002 | Chari et al. .................. 709/224 |
| 6,425,012 B1 | 7/2002 | Trovato et al. |
| 6,430,602 B1 | 8/2002 | Kay et al. |
| 6,430,604 B1 | 8/2002 | Ogle et al. |
| 6,434,599 B1 | 8/2002 | Porter |
| 6,434,606 B1 | 8/2002 | Borella et al. |
| 6,442,591 B1 | 8/2002 | Haynes et al. |
| 6,442,598 B1 | 8/2002 | Wright et al. |
| 6,446,112 B1 | 9/2002 | Bunney et al. |
| 6,446,118 B1 | 9/2002 | Gottlieb |
| 6,446,119 B1 | 9/2002 | Olah et al. |
| 6,449,344 B1 | 9/2002 | Goldfinger et al. |
| 6,449,365 B1 | 9/2002 | Hodges et al. |
| 6,449,479 B1 | 9/2002 | Sanchez |
| 6,449,634 B1 | 9/2002 | Capiel |
| 6,452,950 B1 | 9/2002 | Ohlsson et al. |
| 6,457,044 B1 | 9/2002 | Iwazaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,466,969 B1 | 10/2002 | Bunney et al. |
| 6,473,629 B1 | 10/2002 | Chang |
| 6,480,830 B1 | 11/2002 | Ford et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,490,584 B2 | 12/2002 | Barrett et al. |
| 6,493,703 B1 | 12/2002 | Knight et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B1 | 1/2003 | Garfinkle et al. |
| 6,512,930 B2 | 1/2003 | Sandegren |
| 6,513,026 B1 | 1/2003 | Horvitz et al. |
| 6,515,681 B1 | 2/2003 | Knight |
| 6,519,629 B2 | 2/2003 | Harvey et al. |
| 6,519,639 B1 | 2/2003 | Glasser et al. |
| 6,519,648 B1 | 2/2003 | Eyal |
| 6,529,586 B1 | 3/2003 | Elvins et al. |

(56) References Cited

U.S. PATENT DOCUMENTS

| | | |
|---|---|---|
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,375 B2 | 3/2003 | Kawasaki |
| 6,539,421 B1 | 3/2003 | Appelman et al. |
| 6,542,500 B1 | 4/2003 | Gerzberg et al. |
| 6,549,933 B1 | 4/2003 | Barrett et al. |
| 6,549,937 B1 | 4/2003 | Auerbach et al. |
| 6,553,416 B1 | 4/2003 | Chari et al. |
| 6,556,823 B2 | 4/2003 | Clapton et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,567,854 B1 | 5/2003 | Olshansky et al. |
| 6,571,234 B1 | 5/2003 | Knight et al. |
| 6,578,025 B1 | 6/2003 | Pollack et al. |
| 6,583,799 B1 | 6/2003 | Manolis et al. |
| 6,584,494 B1 | 6/2003 | Manabe et al. |
| 6,587,127 B1 | 7/2003 | Leeke et al. |
| 6,594,363 B1 | 7/2003 | Kim |
| 6,594,673 B1 | 7/2003 | Smith et al. |
| 6,594,682 B2 | 7/2003 | Peterson et al. |
| 6,598,172 B1 | 7/2003 | VanDeusen et al. |
| 6,600,725 B1 | 7/2003 | Roy |
| 6,604,079 B1 | 8/2003 | Ruvolo et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,607,136 B1 | 8/2003 | Atsmon et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |
| 6,636,733 B1 | 10/2003 | Helferich |
| 6,636,850 B2 | 10/2003 | Lepien |
| 6,636,888 B1 | 10/2003 | Bookspan et al. |
| 6,640,218 B1 | 10/2003 | Golding |
| 6,640,223 B1 | 10/2003 | Jones et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,800 B1 | 11/2003 | Rieger, III |
| 6,658,095 B1 | 12/2003 | Yoakum et al. |
| 6,658,260 B2 | 12/2003 | Knotts |
| 6,661,793 B1 | 12/2003 | Pogrebinsky |
| 6,665,317 B1 | 12/2003 | Scott |
| 6,665,676 B2 | 12/2003 | Twig et al. |
| 6,665,715 B1 | 12/2003 | Houri |
| 6,665,728 B1 | 12/2003 | Graumann et al. |
| 6,671,508 B1 | 12/2003 | Mitsuoka et al. |
| 6,677,968 B1 | 1/2004 | Appelman |
| 6,678,719 B1 | 1/2004 | Stimmel |
| 6,678,866 B1 | 1/2004 | Sugimoto et al. |
| 6,683,889 B1 | 1/2004 | Shaffer et al. |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |
| 6,691,162 B1 | 2/2004 | Wick |
| 6,694,353 B2 | 2/2004 | Sommerer |
| 6,697,807 B2 | 2/2004 | McGeachie |
| 6,697,824 B1 | 2/2004 | Bowman-Amuah |
| 6,697,840 B1 | 2/2004 | Godefroid |
| 6,699,125 B2 | 3/2004 | Kirmse et al. |
| 6,701,343 B1 | 3/2004 | Kenyon |
| 6,701,346 B1 | 3/2004 | Klein |
| 6,701,348 B2 | 3/2004 | Sommerer |
| 6,701,351 B1 | 3/2004 | Gann |
| 6,704,727 B1 | 3/2004 | Kravets |
| 6,708,033 B1 | 3/2004 | Linkola et al. |
| 6,708,205 B2 | 3/2004 | Sheldon et al. |
| 6,710,725 B1 | 3/2004 | Soques |
| 6,711,565 B1 | 3/2004 | Subramaniam et al. |
| 6,714,519 B2 | 3/2004 | Luzzatti et al. |
| 6,714,791 B2 | 3/2004 | Friedman |
| 6,714,793 B1 | 3/2004 | Carey et al. |
| 6,721,784 B1 | 4/2004 | Leonard et al. |
| 6,728,357 B2 | 4/2004 | O'Neal et al. |
| 6,731,308 B1 | 5/2004 | Tang et al. |
| 6,732,103 B1 | 5/2004 | Strick et al. |
| 6,732,155 B2 | 5/2004 | Meek |
| 6,732,185 B1 | 5/2004 | Reistad |
| 6,742,127 B2 | 5/2004 | Fox et al. |
| 6,744,764 B1 | 6/2004 | Bigdeliazari et al. |
| 6,747,970 B1 | 6/2004 | Lamb et al. |
| 6,750,881 B1 | 6/2004 | Appelman |
| 6,751,603 B1 | 6/2004 | Bauer et al. |
| 6,754,904 B1 | 6/2004 | Cooper et al. |
| 6,757,365 B1 | 6/2004 | Bogard |
| 6,757,531 B1 | 6/2004 | Haaramo |
| 6,757,682 B1 | 6/2004 | Naimark et al. |
| 6,760,412 B1 | 7/2004 | Loucks |
| 6,760,454 B1 | 7/2004 | Shreve et al. |
| 6,760,580 B2 | 7/2004 | Robinson et al. |
| 6,760,753 B1 | 7/2004 | Ohgushi et al. |
| 6,760,754 B1 | 7/2004 | Isaacs et al. |
| 6,772,188 B1 | 8/2004 | Cloutier |
| 6,781,608 B1 | 8/2004 | Crawford |
| 6,782,414 B1 | 8/2004 | Xue et al. |
| 6,785,554 B1 | 8/2004 | Amerga |
| 6,788,769 B1 | 9/2004 | Waites |
| 6,799,039 B2 | 9/2004 | Wu et al. |
| 6,800,031 B2 | 10/2004 | Di Cesare |
| 6,801,659 B1 | 10/2004 | O'Dell |
| 6,807,423 B1* | 10/2004 | Armstrong .......... H04L 12/1813 370/328 |
| 6,807,558 B1 | 10/2004 | Hassett et al. |
| 6,807,562 B1 | 10/2004 | Pennock et al. |
| 6,816,884 B1 | 11/2004 | Summers |
| 6,816,913 B1 | 11/2004 | Liebenow |
| 6,820,054 B2 | 11/2004 | Erell et al. |
| 6,826,284 B1 | 11/2004 | Benesty et al. |
| 6,829,607 B1 | 12/2004 | Tafoya et al. |
| 6,832,245 B1 | 12/2004 | Isaacs et al. |
| 6,834,306 B1 | 12/2004 | Tsimelzon |
| 6,839,554 B2 | 1/2005 | McDowell |
| 6,839,735 B2 | 1/2005 | Wong et al. |
| 6,839,737 B1 | 1/2005 | Friskel |
| 6,848,008 B1 | 1/2005 | Sevanto et al. |
| 6,848,542 B2 | 2/2005 | Gailey et al. |
| 6,853,982 B2 | 2/2005 | Smith et al. |
| 6,854,007 B1 | 2/2005 | Hammond |
| 6,856,999 B2 | 2/2005 | Flanagin et al. |
| 6,859,460 B1 | 2/2005 | Chen |
| 6,862,298 B1 | 3/2005 | Smith et al. |
| 6,868,498 B1 | 3/2005 | Katsikas |
| 6,876,970 B1 | 4/2005 | Silver et al. |
| 6,883,019 B1 | 4/2005 | Sengupta et al. |
| 6,895,426 B1 | 5/2005 | Cortright et al. |
| 6,898,626 B2 | 5/2005 | Ohashi |
| 6,901,398 B1 | 5/2005 | Horvitz et al. |
| 6,901,559 B1 | 5/2005 | Blum |
| 6,904,026 B1 | 6/2005 | Tarnanen et al. |
| 6,907,243 B1 | 6/2005 | Patel |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,813 B2 | 7/2005 | Elizondo |
| 6,917,965 B2 | 7/2005 | Gupta et al. |
| 6,920,478 B2 | 7/2005 | Mendiola et al. |
| 6,925,469 B2 | 8/2005 | Headings et al. |
| 6,931,419 B1 | 8/2005 | Lindquist |
| 6,934,367 B1 | 8/2005 | LaPierre et al. |
| 6,952,805 B1 | 10/2005 | Tafoya et al. |
| 6,957,077 B2 | 10/2005 | Dehlin |
| 6,985,943 B2 | 1/2006 | Deryugin et al. |
| 6,990,628 B1 | 1/2006 | Palmer et al. |

(56) References Cited

U.S. PATENT DOCUMENTS

| | | |
|---|---|---|
| 6,993,325 B1 | 1/2006 | Wasterlid |
| 6,999,566 B1 | 2/2006 | Eason et al. |
| 6,999,959 B1 | 2/2006 | Lawrence et al. |
| 7,003,551 B2 | 2/2006 | Malik |
| 7,003,794 B2 | 2/2006 | Ayre |
| 7,007,008 B2 | 2/2006 | Goel et al. |
| 7,007,228 B1 | 2/2006 | Carro |
| 7,010,312 B1 | 3/2006 | Zechlin |
| 7,016,978 B2 | 3/2006 | Malik et al. |
| 7,020,849 B1 | 3/2006 | Chen |
| 7,031,961 B2 | 4/2006 | Pitkow et al. |
| 7,032,007 B2 | 4/2006 | Fellenstein et al. |
| 7,035,865 B2 | 4/2006 | Doss et al. |
| 7,035,926 B1 | 4/2006 | Cohen et al. |
| 7,039,193 B2 | 5/2006 | Mantegna et al. |
| 7,039,639 B2 | 5/2006 | Brezin et al. |
| 7,043,530 B2 | 5/2006 | Isaacs et al. |
| 7,054,918 B2 | 5/2006 | Poleyn |
| 7,058,036 B1 | 6/2006 | Yu et al. |
| 7,058,690 B2 | 6/2006 | Maehiro |
| 7,058,892 B1 | 6/2006 | MacNaughton et al. |
| 7,062,533 B2 | 6/2006 | Brown et al. |
| 7,065,186 B1 | 6/2006 | Myers et al. |
| 7,068,769 B1 | 6/2006 | Weaver et al. |
| 7,076,504 B1 | 7/2006 | Handel |
| 7,076,546 B1 | 7/2006 | Bates et al. |
| 7,080,018 B1 | 7/2006 | Fox et al. |
| 7,080,139 B1 | 7/2006 | Briggs et al. |
| 7,082,407 B1 | 7/2006 | Bezos et al. |
| 7,089,237 B2 | 8/2006 | Turnbull et al. |
| 7,089,287 B2 | 8/2006 | Bellotti et al. |
| 7,092,952 B1 | 8/2006 | Wilens |
| 7,092,998 B2 | 8/2006 | Frietas |
| 7,096,009 B2 | 8/2006 | Mousseau et al. |
| 7,096,030 B2 | 8/2006 | Huomo |
| 7,096,214 B1 | 8/2006 | Bharat et al. |
| 7,113,803 B2 | 9/2006 | Dehlin |
| 7,117,254 B2 | 10/2006 | Lunt et al. |
| 7,124,123 B1 | 10/2006 | Roskind et al. |
| 7,127,232 B2 | 10/2006 | O'Neil et al. |
| 7,130,956 B2 | 10/2006 | Rao |
| 7,133,506 B1 | 11/2006 | Smith |
| 7,133,834 B1 * | 11/2006 | Abelow ............... G06Q 10/101 705/1.1 |
| 7,133,898 B1 | 11/2006 | Malik |
| 7,136,903 B1 | 11/2006 | Phillips |
| 7,139,806 B2 | 11/2006 | Hayes et al. |
| 7,142,642 B2 | 11/2006 | McClelland et al. |
| 7,146,404 B2 | 12/2006 | Kay et al. |
| 7,146,416 B1 | 12/2006 | Yoo et al. |
| 7,162,528 B1 | 1/2007 | Simonoff |
| 7,177,880 B2 | 2/2007 | Ruvolo |
| 7,181,417 B1 | 2/2007 | Langseth et al. |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,194,516 B2 | 3/2007 | Giacobbe et al. |
| 7,200,634 B2 | 4/2007 | Mendiola et al. |
| 7,203,507 B2 | 4/2007 | Smith et al. |
| 7,206,814 B2 | 4/2007 | Kirsch |
| 7,209,942 B1 | 4/2007 | Hori et al. |
| 7,209,955 B1 | 4/2007 | Major et al. |
| 7,212,617 B2 | 5/2007 | Owens et al. |
| 7,218,921 B2 | 5/2007 | Mendiola et al. |
| 7,222,309 B2 | 5/2007 | Chupin et al. |
| 7,231,428 B2 | 6/2007 | Teague |
| 7,231,453 B2 | 6/2007 | Mantegna et al. |
| 7,231,478 B2 | 6/2007 | Leijten |
| 7,237,002 B1 | 6/2007 | Estrada |
| 7,237,011 B1 | 6/2007 | St. Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,269,590 B2 | 9/2007 | Hull et al. |
| 7,269,627 B2 | 9/2007 | Knauerhase |
| 7,275,215 B2 | 9/2007 | Werndorfer et al. |
| 7,281,053 B2 | 10/2007 | Mantegna et al. |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,319,882 B2 | 1/2008 | Mendiola et al. |
| 7,324,826 B2 | 1/2008 | Carey et al. |
| 7,337,219 B1 | 2/2008 | Meenan et al. |
| 7,366,522 B2 | 4/2008 | Thomas |
| 7,370,035 B2 | 5/2008 | Gross et al. |
| 7,370,278 B2 | 5/2008 | Malik et al. |
| 7,383,339 B1 | 6/2008 | Meenan et al. |
| 7,392,306 B1 | 6/2008 | Donner et al. |
| 7,401,098 B2 | 7/2008 | Baker |
| 7,403,942 B1 | 7/2008 | Bayliss |
| 7,406,715 B2 | 7/2008 | Clapper |
| 7,411,939 B1 | 8/2008 | Lamb et al. |
| 7,417,650 B1 | 8/2008 | Horvitz et al. |
| 7,424,510 B2 | 9/2008 | Gross et al. |
| 7,428,580 B2 | 9/2008 | Hullfish et al. |
| 7,428,585 B1 | 9/2008 | Owens et al. |
| 7,454,372 B1 | 11/2008 | Anaya et al. |
| 7,475,113 B2 | 1/2009 | Stolze |
| 7,478,414 B1 | 1/2009 | Glusker et al. |
| 7,499,973 B2 | 3/2009 | Couts et al. |
| 7,509,148 B1 | 3/2009 | Pisutha-Arnond et al. |
| 7,512,407 B2 | 3/2009 | Wu et al. |
| 7,543,243 B2 | 6/2009 | Schwartz et al. |
| 7,552,460 B2 | 6/2009 | Goldman |
| 7,590,696 B1 | 9/2009 | Odell |
| 7,600,032 B2 | 10/2009 | Mantegna et al. |
| 7,603,417 B2 | 10/2009 | Ben-Yoseph |
| 7,603,683 B2 | 10/2009 | Reto |
| 7,613,776 B1 | 11/2009 | Ben-Yoseph |
| 7,624,172 B1 | 11/2009 | Austin-Lane |
| 7,640,306 B2 | 12/2009 | Appelman et al. |
| 7,653,693 B2 | 1/2010 | Heikes |
| 7,675,903 B2 | 3/2010 | Ozugur et al. |
| 7,680,796 B2 | 3/2010 | Yeh et al. |
| 7,686,693 B2 | 3/2010 | Danieli et al. |
| 7,716,287 B2 | 5/2010 | Appelman et al. |
| 7,725,541 B2 | 5/2010 | Daniell et al. |
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,836,188 B1 | 11/2010 | Dodrill et al. |
| 7,836,194 B2 | 11/2010 | Mantegna et al. |
| 7,899,862 B2 | 3/2011 | Appelman et al. |
| 7,908,327 B2 | 3/2011 | Kucharewski |
| 7,921,368 B2 | 4/2011 | Moody et al. |
| 7,956,739 B2 | 6/2011 | Hong et al. |
| 7,958,212 B1 | 6/2011 | Wong et al. |
| 7,996,527 B2 | 8/2011 | Isaacs et al. |
| 8,001,199 B2 | 8/2011 | Appelman |
| 8,005,919 B2 | 8/2011 | Mehanna |
| 8,015,504 B1 | 9/2011 | Lynch et al. |
| 8,019,834 B2 | 9/2011 | Horvitz |
| 8,055,675 B2 | 11/2011 | Higgins et al. |
| 8,086,672 B2 | 12/2011 | Horvitz |
| 8,090,821 B2 | 1/2012 | Holt et al. |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,191,001 B2 | 5/2012 | Van Wie et al. |
| 8,224,916 B2 | 7/2012 | Kucharewski |
| 8,316,117 B2 | 11/2012 | Nguyen et al. |
| 8,452,849 B2 | 5/2013 | Mehanna |
| 8,473,572 B1 | 6/2013 | Austin-Lane |
| 8,498,289 B2 | 7/2013 | Castell et al. |
| 8,577,972 B1 | 11/2013 | Heikes |
| 8,701,014 B1 | 4/2014 | Schlegel |
| 8,775,538 B2 | 7/2014 | Heikes |
| 8,775,560 B2 | 7/2014 | Mehanna |

(56) References Cited

U.S. PATENT DOCUMENTS

| | | | |
|---|---|---|---|
| 8,812,583 B2 * | 8/2014 | Franke | 709/203 |
| 8,819,176 B2 | 8/2014 | Mehanna | |
| 2001/0002469 A1 | 5/2001 | Bates et al. | |
| 2001/0003202 A1 | 6/2001 | Mache et al. | |
| 2001/0003203 A1 | 6/2001 | Mache | |
| 2001/0005861 A1 | 6/2001 | Mousseau et al. | |
| 2001/0012286 A1 | 8/2001 | Huna et al. | |
| 2001/0013050 A1 | 8/2001 | Shah | |
| 2001/0013069 A1 | 8/2001 | Shah | |
| 2001/0016823 A1 | 8/2001 | Richards et al. | |
| 2001/0018858 A1 | 9/2001 | Dwek | |
| 2001/0025280 A1 | 9/2001 | Mandato et al. | |
| 2001/0032193 A1 * | 10/2001 | Ferber | 705/79 |
| 2001/0034224 A1 | 10/2001 | McDowell et al. | |
| 2001/0048735 A1 | 12/2001 | O'Neal | |
| 2001/0049636 A1 | 12/2001 | Hudda et al. | |
| 2001/0056363 A1 | 12/2001 | Gantz et al. | |
| 2002/0002520 A1 * | 1/2002 | Gatto | 705/36 |
| 2002/0002586 A1 | 1/2002 | Rafal et al. | |
| 2002/0006126 A1 | 1/2002 | Johnson et al. | |
| 2002/0006788 A1 | 1/2002 | Knutsson et al. | |
| 2002/0006803 A1 | 1/2002 | Mendiola et al. | |
| 2002/0007398 A1 | 1/2002 | Mendiola et al. | |
| 2002/0010803 A1 | 1/2002 | Oberstein et al. | |
| 2002/0016818 A1 | 2/2002 | Kirani et al. | |
| 2002/0021307 A1 | 2/2002 | Glenn et al. | |
| 2002/0023131 A1 | 2/2002 | Wu et al. | |
| 2002/0023132 A1 | 2/2002 | Tornabene et al. | |
| 2002/0023147 A1 | 2/2002 | Kovacs et al. | |
| 2002/0029224 A1 | 3/2002 | Carlsson | |
| 2002/0032729 A1 | 3/2002 | Erickson et al. | |
| 2002/0032742 A1 | 3/2002 | Anderson | |
| 2002/0035605 A1 | 3/2002 | McDowell et al. | |
| 2002/0042830 A1 | 4/2002 | Bose et al. | |
| 2002/0046243 A1 | 4/2002 | Morris | |
| 2002/0046299 A1 | 4/2002 | Lefeber et al. | |
| 2002/0049610 A1 | 4/2002 | Gropper | |
| 2002/0049704 A1 | 4/2002 | Vanderveldt et al. | |
| 2002/0049751 A1 | 4/2002 | Chen et al. | |
| 2002/0049806 A1 | 4/2002 | Gatz et al. | |
| 2002/0049847 A1 | 4/2002 | McArdle et al. | |
| 2002/0049852 A1 | 4/2002 | Lee et al. | |
| 2002/0052921 A1 | 5/2002 | Morkel | |
| 2002/0054092 A1 | 5/2002 | Hedloy | |
| 2002/0059379 A1 | 5/2002 | Harvey et al. | |
| 2002/0059401 A1 | 5/2002 | Austin | |
| 2002/0059425 A1 | 5/2002 | Belfore et al. | |
| 2002/0059526 A1 | 5/2002 | Dillon et al. | |
| 2002/0065828 A1 | 5/2002 | Goodspeed | |
| 2002/0065856 A1 | 5/2002 | Kisiel | |
| 2002/0065894 A1 | 5/2002 | Dalal et al. | |
| 2002/0066036 A1 | 5/2002 | Makineni et al. | |
| 2002/0071539 A1 | 6/2002 | Diament et al. | |
| 2002/0078077 A1 | 6/2002 | Baumann et al. | |
| 2002/0083127 A1 | 6/2002 | Agrawal | |
| 2002/0083136 A1 | 6/2002 | Whitten, II | |
| 2002/0084888 A1 | 7/2002 | Jin | |
| 2002/0087630 A1 | 7/2002 | Wu | |
| 2002/0087649 A1 | 7/2002 | Horvitz | |
| 2002/0087704 A1 | 7/2002 | Chesnais et al. | |
| 2002/0091667 A1 | 7/2002 | Jaipuria et al. | |
| 2002/0091936 A1 | 7/2002 | Tema | |
| 2002/0095464 A1 | 7/2002 | Meek | |
| 2002/0095663 A1 | 7/2002 | Joory | |
| 2002/0097856 A1 | 7/2002 | Wullert, II | |
| 2002/0103801 A1 | 8/2002 | Lyons | |
| 2002/0112181 A1 | 8/2002 | Smith | |
| 2002/0112239 A1 | 8/2002 | Goldman | |
| 2002/0116461 A1 | 8/2002 | Diacakis et al. | |
| 2002/0116463 A1 | 8/2002 | Hart | |
| 2002/0116528 A1 | 8/2002 | Vale | |
| 2002/0116641 A1 | 8/2002 | Mastrianni | |
| 2002/0118809 A1 | 8/2002 | Eisenberg | |
| 2002/0119789 A1 | 8/2002 | Friedman | |
| 2002/0120687 A1 | 8/2002 | Diacakis et al. | |
| 2002/0120697 A1 | 8/2002 | Generous et al. | |
| 2002/0120779 A1 | 8/2002 | Teeple et al. | |
| 2002/0123328 A1 | 9/2002 | Snip et al. | |
| 2002/0123988 A1 | 9/2002 | Dean et al. | |
| 2002/0128047 A1 | 9/2002 | Gates | |
| 2002/0130904 A1 | 9/2002 | Becker et al. | |
| 2002/0133369 A1 | 9/2002 | Johnson | |
| 2002/0136390 A1 | 9/2002 | Lang et al. | |
| 2002/0137530 A1 | 9/2002 | Karve | |
| 2002/0138650 A1 | 9/2002 | Yamamoto et al. | |
| 2002/0143565 A1 | 10/2002 | Headings et al. | |
| 2002/0144283 A1 | 10/2002 | Headings et al. | |
| 2002/0151294 A1 | 10/2002 | Kirby et al. | |
| 2002/0154178 A1 | 10/2002 | Barnett | |
| 2002/0155826 A1 | 10/2002 | Robinson et al. | |
| 2002/0160757 A1 | 10/2002 | Shavit et al. | |
| 2002/0160805 A1 | 10/2002 | Laitinen et al. | |
| 2002/0165000 A1 | 11/2002 | Fok | |
| 2002/0165729 A1 | 11/2002 | Kuebert et al. | |
| 2002/0169748 A1 | 11/2002 | Macholda | |
| 2002/0174050 A1 | 11/2002 | Enyard | |
| 2002/0174260 A1 | 11/2002 | Huang | |
| 2002/0175953 A1 | 11/2002 | Lin | |
| 2002/0178072 A1 | 11/2002 | Gusler et al. | |
| 2002/0178161 A1 | 11/2002 | Brezin et al. | |
| 2002/0181703 A1 | 12/2002 | Logan et al. | |
| 2002/0184089 A1 | 12/2002 | Tsou et al. | |
| 2002/0184128 A1 | 12/2002 | Holtsinger | |
| 2002/0184309 A1 | 12/2002 | Danker et al. | |
| 2002/0187794 A1 | 12/2002 | Fostick et al. | |
| 2002/0188620 A1 | 12/2002 | Doss et al. | |
| 2002/0194378 A1 | 12/2002 | Foti | |
| 2002/0199095 A1 | 12/2002 | Bandini et al. | |
| 2003/0004855 A1 | 1/2003 | Dutta | |
| 2003/0004872 A1 | 1/2003 | Gardi et al. | |
| 2003/0006912 A1 | 1/2003 | Brescia | |
| 2003/0009385 A1 | 1/2003 | Tucciarone et al. | |
| 2003/0009698 A1 | 1/2003 | Lindeman et al. | |
| 2003/0014485 A1 | 1/2003 | Banatwala | |
| 2003/0018704 A1 | 1/2003 | Polychronidis et al. | |
| 2003/0018726 A1 | 1/2003 | Low et al. | |
| 2003/0018747 A1 | 1/2003 | Herland et al. | |
| 2003/0023681 A1 | 1/2003 | Brown et al. | |
| 2003/0023684 A1 | 1/2003 | Brown et al. | |
| 2003/0023690 A1 | 1/2003 | Lohtia | |
| 2003/0023692 A1 | 1/2003 | Moroo | |
| 2003/0023875 A1 | 1/2003 | Hursey | |
| 2003/0025824 A1 | 2/2003 | Ishikawa | |
| 2003/0028524 A1 | 2/2003 | Keskar | |
| 2003/0028595 A1 | 2/2003 | Vogt et al. | |
| 2003/0028597 A1 | 2/2003 | Salmi | |
| 2003/0028884 A1 | 2/2003 | Swart et al. | |
| 2003/0037110 A1 | 2/2003 | Yamamoto | |
| 2003/0037112 A1 | 2/2003 | Fitzpatrick et al. | |
| 2003/0037114 A1 | 2/2003 | Nishio et al. | |
| 2003/0042306 A1 | 3/2003 | Irwin | |
| 2003/0045272 A1 | 3/2003 | Burr | |
| 2003/0046097 A1 | 3/2003 | LaSalle et al. | |
| 2003/0050916 A1 | 3/2003 | Ortega | |
| 2003/0050976 A1 | 3/2003 | Block | |
| 2003/0051161 A1 | 3/2003 | Smith et al. | |
| 2003/0052915 A1 | 3/2003 | Brown et al. | |
| 2003/0054830 A1 | 3/2003 | Williams et al. | |
| 2003/0055831 A1 | 3/2003 | Ryan | |
| 2003/0055897 A1 | 3/2003 | Brown et al. | |
| 2003/0058478 A1 | 3/2003 | Aoki | |
| 2003/0060211 A1 | 3/2003 | Chern | |
| 2003/0064422 A1 | 4/2003 | McDevitt | |
| 2003/0065721 A1 | 4/2003 | Roskind | |
| 2003/0078981 A1 | 4/2003 | Harms et al. | |
| 2003/0078987 A1 | 4/2003 | Serebrennikov et al. | |
| 2003/0079024 A1 | 4/2003 | Hough et al. | |
| 2003/0081001 A1 | 5/2003 | Munro | |
| 2003/0083046 A1 | 5/2003 | Mathis | |
| 2003/0086438 A1 | 5/2003 | Laumen et al. | |
| 2003/0087632 A1 | 5/2003 | Sagi et al. | |
| 2003/0088554 A1 | 5/2003 | Ryan | |
| 2003/0101226 A1 | 5/2003 | Quine | |
| 2003/0101343 A1 | 5/2003 | Eaton et al. | |

(56) References Cited

U.S. PATENT DOCUMENTS

| | | |
|---|---|---|
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131060 A1 | 7/2003 | Hartselle et al. |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174154 A1 | 9/2003 | Yukie et al. |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0193967 A1 | 10/2003 | Fenton et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212686 A1 | 11/2003 | Chu-Carroll et al. |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0002972 A1 | 1/2004 | Pather et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0017396 A1 | 1/2004 | Werndorfer et al. |
| 2004/0019612 A1 | 1/2004 | Tyra et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0061716 A1 | 4/2004 | Cheung et al. |
| 2004/0064586 A1 | 4/2004 | Weigand |
| 2004/0073643 A1 | 4/2004 | Hayes et al. |
| 2004/0076272 A1 | 4/2004 | Zafar et al. |
| 2004/0078440 A1 | 4/2004 | Potter et al. |
| 2004/0078445 A1 | 4/2004 | Malik |
| 2004/0081951 A1 | 4/2004 | Vigue et al. |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098462 A1 | 5/2004 | Horvitz et al. |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligman et al. |
| 2004/0153832 A1 | 8/2004 | Hasha |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0172481 A1 | 9/2004 | Engstrom |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blatter et al. |

(56) References Cited

U.S. PATENT DOCUMENTS

| | | |
|---|---|---|
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186909 A1 | 9/2004 | Greenwood |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearigen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Krimse et al. |
| 2005/0038856 A1 | 2/2005 | Krishnasamy |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appelman |
| 2005/0076241 A1 | 4/2005 | Appelman |
| 2005/0086211 A1 | 4/2005 | Mayer |
| 2005/0086305 A1 | 4/2005 | Koch et al. |
| 2005/0091314 A1 | 4/2005 | Blagsvedt et al. |
| 2005/0976241 | 4/2005 | Appelman |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Mathew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130633 A1 | 6/2005 | Hill et al. |
| 2005/0137963 A1 | 6/2005 | Ricketts et al. |
| 2005/0144133 A1 | 6/2005 | Hoffman et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0210120 A1* | 9/2005 | Yukie et al. ............... 709/217 |
| 2005/0216300 A1 | 9/2005 | Appelman et al. |
| 2005/0216421 A1 | 9/2005 | Barry et al. |
| 2005/0223075 A1 | 10/2005 | Swearigen et al. |
| 2005/0239550 A1 | 10/2005 | Hardisty et al. |
| 2005/0246420 A1 | 11/2005 | Little |
| 2005/0250440 A1 | 11/2005 | Zhou et al. |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0161638 A1 | 7/2006 | Meyer et al. |
| 2006/0168204 A1 | 7/2006 | Appelman et al. |
| 2006/0195554 A1 | 8/2006 | Payne et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0011314 A1* | 1/2007 | Horvitz et al. ............... 709/224 |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0174448 A1 | 7/2007 | Ahuja et al. |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0046524 A1 | 2/2008 | Jerding et al. |
| 2008/0065767 A1 | 3/2008 | Stachura et al. |
| 2008/0133417 A1 | 6/2008 | Robinson |
| 2008/0215672 A1 | 9/2008 | Kloba et al. |
| 2008/0255989 A1 | 10/2008 | Altberg et al. |
| 2008/0258913 A1 | 10/2008 | Busey |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0181702 A1 | 7/2009 | Vargas et al. |
| 2009/0241144 A1* | 9/2009 | LaJoie et al. ............... 725/40 |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0005294 A1 | 1/2012 | Weyer et al. |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0013686 A1 | 1/2013 | Kucharewski |
| 2013/0031638 A1 | 1/2013 | Appelman |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067003 A1 | 3/2013 | Heikes |
| 2013/0072239 A1 | 3/2013 | Hullfish |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appelman |

(56) References Cited

U.S. PATENT DOCUMENTS

| | | |
|---|---|---|
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0132482 A1 | 5/2013 | Austin-Lane |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0173735 A1 | 7/2013 | Austin-Lane |
| 2013/0174060 A1 | 7/2013 | Odell |
| 2013/0198648 A1 | 8/2013 | Austin-Lane |
| 2013/0198649 A1 | 8/2013 | Austin-Lane |
| 2015/0113066 A1 | 4/2015 | Austin-Lane |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 0921666 | 9/1999 |
| EP | 0987894 | 3/2000 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 95/22233 | 8/1995 |
| WO | WO 97/10558 | 3/1997 |
| WO | WO 97/34244 | 9/1997 |
| WO | WO 97/37303 | 10/1997 |
| WO | WO 97/46955 | 12/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/46686 | 8/2000 |
| WO | WO 00/47270 | 8/2000 |
| WO | WO 00/60809 | 10/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/78315 | 10/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2006/026908 | 3/2003 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/066092 | 6/2006 |
| WO | WO 2006/068955 | 6/2006 |

OTHER PUBLICATIONS

U.S. Appl. No. 13/616,359, filed Sep. 14, 2012, Austin-Lane.
U.S. Appl. No. 13/616,380, filed Sep. 14, 2012, Austin-Lane.
U.S. Appl. No. 13/679,988, filed Nov. 16, 2012, Mantegna et al.
"AOL technology: turning complicated things into engaging services", 1996 Annual Report, 22 pages.
"Yahoo! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
Office Action, U.S. Appl. No. 09/624,191, dated Feb. 22, 2005, 13 pages.
"Siteseer: Personalized Navigation for the Web," published Mar. 1997 in Communications of the ACM (vol. 40, No. 3), authored by James Rucker and Marcos J. Polanco.
"Building Consumer Trust with Accurate Product Recommendations: A White Paper on LikeMinds WebSell 2.1," published 1997, authored by Dan R. Greening.
"Making Recommender Systems Work for Organizations," published Apr. 1999 by "Proceedings of PAAM '99," authored by Nathalie Glance, Damian Arregui, and Manfred Dardenne.
"Knowledge Pump: Community-centered Collaborative Filtering," published Oct. 27, 1997, authored by Natalie Glance, Damian Arregui, and Manfred Dardenne.
Microstrategy, Inc. "MicroStrategy Launches Strategy.com, the World's First Personal Intelligence Network," press release dated Jun. 28, 1999.

(56) References Cited

OTHER PUBLICATIONS

"WebCobra: An Automated Collaborative Filtering Agent System for the World Wide Web," published Dec. 5, 1997, authored by Steve Nesbitt.
Office Action, U.S. Appl. No. 12/615,136, dated May 11, 2011, 22 pages.
Office Action, U.S. Appl. No. 12/615,136, dated Nov. 26, 2010, 23 pages.
Office Action, U.S. Appl. No. 12/615,136, dated Oct. 25, 2011, 22 pages.
Office Action, U.S. Appl. No. 12/615,136, dated Apr. 12, 2012, 31 pages.
Notice of Allowance, U.S. Appl. No. 12/615,136, dated Dec. 24, 2012, 23 pages.
Office Action from Copending U.S. Appl. No. 09/624,192, dated May 16, 2007.
Response to Office Action from copending U.S. Appl. No. 09/624,192, filed Aug. 10, 2007.
J.S. Erkelens and P.M.T. Broersen, "Bias Propagation in the Autocorrelation Method of Linear Prediction", IEEE Transactions on Speech and Audio Processing, vol. 5, No. 2, pp. 116-119, Mar. 1997.
Itakura, F.; Saito, S.; Koike, T.; Sawabe, H.; Nishikawa, M.; An Audio Response Unit Based on Partial Autocorrelation Communications, IEEE Transactions on [legacy, pre-1988], vol. 20, Issue: 4, Aug. 1972, pp. 792-797.
Hodson, O., Perkins, C., Hardman, V. "Skew detection and compensation for Internet audio applications" ICME 2000, Jul. 2000, vol. 3, pp. 1687-1690.
Office Action dated Dec. 26, 2008 from co-pending U.S. Appl. No. 11/760,204; 14 pages.
Office Action, U.S. Appl. No. 09/624,192, dated Dec. 4, 2003, 8 pages.
Office Action, U.S. Appl. No. 09/624,192, dated May 13, 2004, 14 pages.
Office Action, U.S. Appl. No. 09/624,192, dated Jul. 14, 2005, 15 pages.
Office Action, U.S. Appl. No. 09/624,192, dated Aug. 23, 2006, 13 pages.
Office Action, U.S. Appl. No. 09/624,192, dated Nov. 1, 2007, 11 pages.
Office Action, U.S. Appl. No. 09/624,192, dated Sep. 5, 2008, 40 pages.
Office Action, U.S. Appl. No. 09/624,192, dated Mar. 5, 2009, 10 pages.
Notice of Allowance, U.S. Appl. No. 09/624,192, dated Jul. 10, 2009, 12 pages.
Office Action, U.S. Appl. No. 09/624,191, dated Jul. 16, 2003, 11 pages.
Office Action, U.S. Appl. No. 09/624,191, dated Apr. 7, 2004, 9 pages.
Office Action, U.S. Appl. No. 09/624,191, dated Jul. 13, 2005, 15 pages.
Office Action, U.S. Appl. No. 09/624,191, dated Jan. 30, 2006, 16 pages.
Office Action, U.S. Appl. No. 09/624,191, dated Jul. 18, 2006, 18 pages.
Office Action, U.S. Appl. No. 09/624,191, dated May 2, 2007, 12 pages.
Notice of Allowance, U.S. Appl. No. 09/624,191, dated Oct. 14, 2007, 14 pages.
Office Action, U.S. Appl. No. 09/844,656, dated Jun. 15, 2004, 9 pages.
Office Action, U.S. Appl. No. 09/844,656, dated Mar. 9, 2005, 10 pages.
Office Action, U.S. Appl. No. 09/844,656, dated Aug. 12, 2005, 9 pages.
Notice of Allowance, U.S. Appl. No. 09/844,656, dated Dec. 7, 2005, 7 pages.
Office Action, U.S. Appl. No. 09/845,083, dated May 25, 2004, 10 pages.
Office Action, U.S. Appl. No. 09/845,083, dated May 20, 2005, 9 pages.
Office Action, U.S. Appl. No. 09/845,083, dated Oct. 13, 2005, 17 pages.
Office Action, U.S. Appl. No. 09/845,083, dated Apr. 6, 2006, 13 pages.
Office Action, U.S. Appl. No. 09/845,083, dated Jun. 22, 2006, 10 pages.
Office Action, U.S. Appl. No. 09/845,083, dated Feb. 8, 2007, 18 pages.
Notice of Allowance, U.S. Appl. No. 09/845,083, dated Jun. 1, 2007, 13 pages.
Office Action, U.S. Appl. No. 11/868,114, dated Jun. 15, 2009, 18 pages.
Office Action, U.S. Appl. No. 11/868,114, dated Jan. 7, 2010, 8 pages.
Notice of Allowance, U.S. Appl. No. 11/868,114, dated Mar. 15, 2010, 12 pages.
Notice of Allowance, U.S. Appl. No. 11/868,114, dated Jun. 24, 2010, 13 pages.
Office Action, U.S. Appl. No. 09/845,084, dated Jun. 9, 2004, 7 pages.
Office Action, U.S. Appl. No. 09/845,084, dated Mar. 30, 2005, 9 pages.
Office Action, U.S. Appl. No. 09/845,084, dated Oct. 20, 2005, 12 pages.
Office Action, U.S. Appl. No. 09/845,084, dated Apr. 5, 2006, 14 pages.
Office Action, U.S. Appl. No. 09/845,084, dated Oct. 19, 2006, 10 pages.
Notice of Allowance, U.S. Appl. No. 09/845,084, dated Feb. 8, 2007, 16 pages.
Office Action, U.S. Appl. No. 11/760,204, dated Dec. 26, 2008, 17 pages.
Notice of Allowance, U.S. Appl. No. 11/760,204, dated Jun. 3, 2009, 13 pages.
International Search Report dated Oct. 18, 2001 as received in PCT/US01/40468.
U.S. Appl. No. 09/624,192, Feb. 8, 2006, Office Action.
U.S. Appl. No. 12/615,136, Apr. 24, 2013, Notice of Allowance.
U.S. Appl. No. 13/617,330, Dec. 1, 2014, Office Action.
U.S. Appl. No. 13/731,124, Mar. 12, 2015, Office Action.
U.S. Appl. No. 13/766,785, Jan. 30, 2015, Office Action.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
U.S. Appl. No. 14/324,959, filed Jul. 8, 2014, Austin-Lane.
U.S. Appl. No. 14/326,221, filed Jul. 8, 2014, Austin-Lane.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.

(56) References Cited

OTHER PUBLICATIONS

Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http://www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts-Google Scholar" available at http://scholar.google.com/scholar?h1=en&1r= &q=creating+a+single+1ist+1ist+of+contacts&as . . . (Mar. 27, 2007), 10 pages.
CommWorks 8250 Personal Communications Management System; Dec. 11,2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/0-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/ 24434d1b-817b-4580 -aa42 -3bffal5f26a?pages=1 , (4 pages), printed from Internet Dec. 13, 2004, message dated Oct. 19, 2003.
http://www.friendster.com , (17 pages), Dec. 2004.
http://www.knockrnail.com/support/newsettings.jpg, as accessed on Dec. 4. 2003.
"Icq.anywhere, Email Features-Email Center-ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com ; pp. 1-2.
Ignite Software: Parent Tools Feature Set, "Parent Tools Features," http://www.parenttools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/ allpublic . . . , (visted Jul. 28, 2003).

(56) References Cited

OTHER PUBLICATIONS

IBM Lotus Software, Sametime Everyplace Wireless Collaboration that's Fit for e-Business, pp. 1-6, http://www.lotus.com/products.wireless.nsf/allpublic . . . , (visited Jul. 28, 2003).

IM Means Business IEEE Spectrum, Nov. 2002.

imForwards.com-FAQ's; Oct. 21, 2003.

Index of /tarvizo/oldfiles/elips/tnt-2.4, Jul. 2, 2001, TNT, http://web.mit.edu/tarvizo/oldfiles/elips/tnt-2.4/.

Instant messaging in teen life, Grinter, R.E. and Palen, L., Proceedings of the 2002 ACM conference on Computer supported cooperative work, pp. 21-30, Nov. 2002, ACM Press, New York, NY, USA.

Instant Messaging with Mobile Phones to Support Awareness, Mitsuoka, M. and Watanabe, S. and Kakuta, J. and Okuyama, S., pp. 223-230, Jan. 2001, IEEE.

"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0&adxnnlx=107029 . . . , printed on Nov. 5, 2004 (2 pages).

"Instant Messaging for Gamers," PC Gamer, May 2004, vol. 11, No. 5, (2 pages).

J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.

J. Dudley, "Telstra targets Net spammers", news.com.au , Dec. 2, 2003.

Jabber, Inc., Jabber Wireless Gateway Overview, May 2001.

"Jabber" http://www.jabber.com/index.cgi?CONTENTID=9, as accessed on Dec. 4, 2003.

Jennifer B. Lee, "From 100 countries, a Google snapshot of what's going on," International Herald Tribune, Nov. 29, 2002, pp. 1-3, http://www.iht.com.

Joanna Glasner, "Social Nets Find Friends in VCs", Nov. 17, 2003, available at http://www.wired.com/culture/lifestyle/news/2003/11/61227?currentPage=al.

Jonathan B Postel, "Simple Mail Transfer Protocol", RFC788, Information Science Institute, Nov. 1981.

Julian Byrne, "My Spamblock was thrwarting UCE address culling programs", news.admin.net-abuse.e-mail, Jan. 19, 1997.

"Knock Settings ServersTab," http://www.knockmail.com/support/advserverset.html, pp. 1-2, as accessed on Dec. 4, 2003.

Komatsu et al., "Text Input with Dynamic Abbreviation Expansion," IPSJ SIG Notes, vol. 2001, No. 87, Sep. 14, 2008, pp. 133-138, in Japanese with a partial English Translation.

Kirk Scott, Ubique's Virtual Places: Communication and interaction on the World Wide Web, 1 page, http://www.w3.org/collabroation/workshop/proceedings/p2.html, (visted Jul. 28, 2003).

Kyungkoo Jun, et al., "Agent-Based Resource Discovery", IEEE (Feb. 2000), 10 pages.

Laliberte et al., "A Protocol for Scalable Group and Public Annotations," Elsevier, Apr. 1995, pp. 911-918.

Leander Kahney, "Will You Buy a Car From This Man?", Oct. 6, 2003, pp. 1-3, available at http://www.wired.com/techbizlmedia/news/2003/10/60703.

"Learning Spam: Simple Techniques for Freely-Available Software," Bart Massey et ai, Computer Science Dept., Portland, or USA, Apr. 2003, pp. 1-14.

"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).

Lieberman, H., "Letizia: An Agent that Assists Web Browsing", Aug. 20, 1995, pp. 924-929.

"Listserv Control for KnockKnock," http://www.knockmail com/supporUlistservcont.html, pp. 1, as accessed on Dec. 4, 2003.

Luis Felipe Cabrera et al., "Herald: Achieving a Global Event NotificationService", Microsoft Research, May 2001.

M. Castelluccio, "E-mail in Real Time", Strategic Finance, Sep. 1999, INSPEC p. 10.

M. Day, S Aggarwal, G Mohr, J. Vincent, RFC 2279 Instant Messaging/Presence Protocol Requirements, Feb. 2000.

M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.

M. Smith et al.; Conversation Trees and Threaded Chats; Collaboration & Multimedia Group, Microsoft Research, Redmond, WA, Feb. 2000.

"Managing your Addresses in Knockmail," http://www.knockmail.com/supporUmanaddresses.html, pp. 1-2, as accessed on Dec. 4, 2003.

McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.

Mark Handel et al., "TeamPortal: Providing Team Awareness on the Web", Dec. 2000.

McKendrick, Joseph; "Internet Call Centers: New Era in Customer Service", Feb. 2002; VIO, n2, (4 pages).

Microservices: CommWorks Find Me-Follow Me Application; Dec 11, 2002; commworks.com; pp. 1-2.

Microservices: CommWorks Message Alert System; Dec. 11, 2002; commworks.com; pp. 1-3.

Microservices: CommWorks Message Delivery System; Dec. 11, 2002; commworks.com; pp. 1-2.

Microsoft PressPass; Nov. 7, 2002; microsoft.com ; pp. 1-9.

Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.

Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.

Mozilla, www.mozilla.org/projects/ml/autocomplete, Mar. 13, 2003.

Moore, J. "AOL's Grand Goal; America Online seeks to transform itself into a major Internet player,"Information Week, Jul. 31, 1995, lines 7-23, pp. 38-42.

N. Liew Kwek Sing; AOL ICQ vs. MSN Messenger; Department of Electronic and Computer Science, University of Southampton, Mar. 2003.

Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.

Nextel Announces On-Line Paging Service Provided by Wireless Services—First Wireless Telephone Messaging Service to Offer Delivery Confirmation, Aug. 12, 1998, NY.

Net Alerts Overview; Nov. 7, 2002; microsoft.com ; pp. 1-3.

Neo Mai, Ken Neo. "Buying and selling on the internet; [Computimes, 2* Edition]." New Straits Times. Kuala Lumpur: Jun. 28, 2001. p. 53.

Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.

Olsen, Stefanie, "Will instant messaging become instant spamming?,". http://news.com.com/2100-1023 -252765.html?legacy=cnet, Feb. 16, 2001, pp. 1-4.

Ozmosys Enterprise; Nov. 7, 2002; ozmosys.com ; pp. 1-3.

"Pending Database for KnockKnock," http://www.knockmail coml support/penddatabase.html, pp. 1, as accessed on Dec. 4, 2003.

"Preview Pending Emails in KnockMail," http://www.knockmail.com/supporUpreviewemail.html, pp. 1-2, as accessed on Dec. 4, 2003.

(56) References Cited

OTHER PUBLICATIONS

"Protect Your Privacy," MSN Features, http://messenger.msn.com/Feature/Privacy.aspx, as accessed on Dec. 2, 2003.
Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messaging Services; Agder University College, Jun. 2002.
Per E. Pedersen; The Adoption of Text Messaging services among Norwegian Teens: Development and Test of an Extended Adoption Model; SNF-Report No. 23/02; Samfunns-Og Naeringslivsforskning as Bergen, Jun. 2002.
Phillips Business Information corporation-Aug. 23, 1999-Instant messaging has emerged as one of the most popular communication mediums in the world.
"Prodigy Launches 100 Interest Groups on the World Wide Web; All Sites Have Deep Links to Chat and Newsgroups; Topics Range from "Adventure Travel" and "Astrology" to "Virtual Reality" and Wrestling", Business Wire, Sep. 27, 1995, 4 Pages.
"Plaxo-Update Your Address Book," Plaxo Contact Networks, reprinted from http://web.archive.org/web/20030218233638/http://www.plaxo.com printed on Nov. 5, 2004(available on Feb. 18, 2003), (1 page).
"Plaxo", Plaxo, reprinted from http://web.archive.org/web/20041105072256/http://www.plaxo.com/ printed on Nov. 5, 2004(available on Feb. 14, 2004) (2 pages).
Parent Tools TheUltimate in Monitoring and Controlling AIM
"Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant -Messaging-20 . . . , pp. 1-4.
"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf. org/id/draft-movva-msn-messenger-protocol-oo.bct, 28 pages.
Reichard, K., "AOL, ICO to Interoperate-But in a Limited Fashion," Oct. 30, 2002, InstantMessagingPlanet, available at www.instantmessagingplanet.com/public/articie.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on May 21, 2013.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).

SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM-2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report-The Early Show segment, "Big Brother in the Corner Office," Julie Chen, cbsnews.com/earlyshow/caught/techage/20001228esniff.shtml, Dec. 28, 2000: Tech Age.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/productoverview.html, May 15, 2001.
"Text Categorization with Support Vector Machines: Learning with Many Relevant Features," Thorsten Joachims, University of Dortmund, Computer Science Dept., LS-8 Report 23, 1998, (18 paqes), Nov. 27, 1997, revised Apr. 19, 1998.
"Technology Journal-Are You Satisfied? EBay's Battle Against Fraud Rests Primarily on a SimpleConcept: Customer Feedback," Wingfield, Sep. 23, 2002, Asian Wall Street Journal, p. T.8, (4 total pages).
"Technology Journal: Changing Chat-Instant Messaging is Taking Off, and for Some Users It's Nuzzling Out the Phone," Nick Wingfield, Asian WSJ, Sep. 2000, (5 pages).
"Trillian Discussion Forums-HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sametime with Chris Price", pp. 1-8, http://www.10.1otus.com/ldd/today.nsf/DisplayForm/ . . . , (Visited Jul. 28, 2003), Sep. 2002.
Teraitech; Nov. 7, 2002; teraitech.com ; 1 page.

(56) References Cited

OTHER PUBLICATIONS

Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive.org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard of Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
Notification of Transmittal of the International Search Report and the Written Opinion of the International Searching Authority for International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application No. 97946924.4-1238, 6 pages.
Office Action mailed May 21, 2008 for European Application No. 97946924.4-1238, 10 pages.
International Search Report and Written Opinion for International Application No. PCT/US05/45630, Dated Oct. 23, 2006.
International Search Report dated Jan. 27, 2005 for International Application No. PCTUS2004/009422, International Filing Date Mar. 26, 2004.
International Search Report issued in International Application No. PCT/US03/36795 mailed Jun. 23, 2004, 9 pages.
International Search Report mailed Dec. 27, 2005 for International Application No. PCT/US2004/29291, filed Sep. 8, 2004.
International Search Report, Application Serial No. PCT/US04/23382, dated Feb. 1, 2007, 12 pages.
International Search Report of PCT/US03/36654 dated Aug. 17, 2004.
International Standard, Information technology-telecommunications and information exchange between systems-private integrated services network-specifications, functional model and information flows-Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.
U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.

(56) References Cited

OTHER PUBLICATIONS

U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,213, Dec. 6, 2013, Notice of Allowance.
U.S. Appl. No. 10/715,214, Apr. 20, 2007, Office Action.
U.S. Appl. No. 10/715,214, Oct. 9, 2007, Office Action.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Aug. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/023,652, Apr. 29, 2014, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 28, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Sep. 2, 2011, Office Action.
U.S. Appl. No. 13/189,972, Jan. 5, 2012, Office Action.
U.S. Appl. No. 13/189,972, May 7, 2012, Office Action.
U.S. Appl. No. 13/189,972, Aug. 22, 2012, Notice of Allowance.
U.S. Appl. No. 13/189,972, Dec. 21, 2012, Office Action.
U.S. Appl. No. 13/189,972, Jul. 24, 2013, Office Action.
U.S. Appl. No. 13/189,972, Oct. 29, 2013, Office Action.
U.S. Appl. No. 13/189,972, Apr. 21, 2014, Office Action.
U.S. Appl. No. 13/189,972, Oct. 2, 2014, Office Action.
U.S. Appl. No. 13/361,141, Mar. 19, 2013, Office Action.
U.S. Appl. No. 13/361,141, Aug. 15, 2013, Office Action.
U.S. Appl. No. 13/361,141, Jan. 17, 2014, Office Action.
U.S. Appl. No. 13/372,371, May 9, 2013, Office Action.
U.S. Appl. No. 13/372,371, Nov. 29, 2013, Office Action.
U.S. Appl. No. 13/372,371, Mar. 26, 2014, Office Action.
U.S. Appl. No. 13/372,371, Jul. 1, 2014, Notice of Allowance.
U.S. Appl. No. 13/442,226, Apr. 14, 2014, Office Action.
U.S. Appl. No. 13/507,429, Oct. 25, 2013, Office Action.
U.S. Appl. No. 13/507,429, Mar. 28, 2014, Office Action.
U.S. Appl. No. 13/614,640, Oct. 2, 2013, Office Action.
U.S. Appl. No. 13/614,640, Jan. 31, 2014, Office Action.
U.S. Appl. No. 13/614,640, Jun. 11, 2014, Notice of Allowance.
U.S. Appl. No. 13/614,781, Jun. 4, 2013, Office Action.
U.S. Appl. No. 13/614,781, Sep. 12, 2013, Office Action.
U.S. Appl. No. 13/614,781, Dec. 26, 2013, Office Action.
U.S. Appl. No. 13/614,781, Apr. 2, 2014, Office Action.
U.S. Appl. No. 13/617,270, Sep. 12, 2013, Office Action.
U.S. Appl. No. 13/617,270, Apr. 10, 2014, Office Action.
U.S. Appl. No. 13/617,330, Sep. 12, 2013, Office Action.
U.S. Appl. No. 13/617,330, Apr. 8, 2014, Office Action.
U.S. Appl. No. 13/617,350, Mar. 27, 2014, Office Action.

(56) References Cited

OTHER PUBLICATIONS

U.S. Appl. No. 13/617,350, Oct. 10, 2014, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,009, Mar. 12, 2014, Notice of Allowance.
U.S. Appl. No. 13/619,009, Apr. 11, 2014, Notice of Allowance.
U.S. Appl. No. 13/619,036, Mar. 26, 2013, Office Action.
U.S. Appl. No. 13/619,036, Sep. 16, 2013, Office Action.
U.S. Appl. No. 13/619,036, Mar. 21, 2014, Office Action.
U.S. Appl. No. 13/619,054, Mar. 26, 2013, Office Action.
U.S. Appl. No. 13/619,054, Oct. 10, 2013, Office Action.
U.S. Appl. No. 13/619,054, Apr. 7, 2014, Office Action.
U.S. Appl. No. 13/620,851, Feb. 8, 2013, Office Action.
U.S. Appl. No. 13/620,851, Nov. 29, 2013, Office Action.
U.S. Appl. No. 13/620,851, Apr. 8, 2014, Office Action.
U.S. Appl. No. 13/620,853, Feb. 13, 2013, Office Action.
U.S. Appl. No. 13/620,853, Jan. 9, 2014, Office Action.
U.S. Appl. No. 13/620,856, Feb. 13, 2013, Office Action.
U.S. Appl. No. 13/620,856, Jan. 9, 2014, Office Action.
U.S. Appl. No. 13/620,862, Jul. 24, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/729,318, Sep. 18, 2013, Office Action.
U.S. Appl. No. 13/729,318, Feb. 5, 2014, Office Action.
U.S. Appl. No. 13/731,124, Dec. 6, 2013, Office Action.
U.S. Appl. No. 13/731,124, Jun. 30, 2014, Office Action.
U.S. Appl. No. 13/755,990, Oct. 2, 2013, Office Action.
U.S. Appl. No. 13/755,990, Jan. 29, 2014, Office Action.
U.S. Appl. No. 13/755,990, May 16, 2014, Notice of Allowance.
U.S. Appl. No. 13/766,775, Sep. 19, 2013, Office Action.
U.S. Appl. No. 13/766,775, Mar. 24, 2014, Office Action.
U.S. Appl. No. 13/766,779, Oct. 15, 2013, Office Action.
U.S. Appl. No. 13/766,779, Apr. 11, 2014, Office Action.
U.S. Appl. No. 13/766,781, Nov. 27, 2013, Office Action.
U.S. Appl. No. 13/766,781, May 6, 2014, Office Action.
U.S. Appl. No. 13/766,785, Nov. 29, 2013, Office Action.
U.S. Appl. No. 13/766,785, May 14, 2014, Office Action.
U.S. Appl. No. 13/766,786, Nov. 27, 2013, Office Action.
U.S. Appl. No. 13/766,786, May 8, 2014, Office Action.
U.S. Appl. No. 13/766,786, Oct. 1, 2014, Office Action.
U.S. Appl. No. 13/616,380, Nov. 6, 2014, Office Action.
U.S. Appl. No. 13/617,270, Dec. 4, 2014, Office Action.
U.S. Appl. No. 13/766,775, Dec. 5, 2014, Office Action.
U.S. Appl. No. 13/766,779, Dec. 4, 2014, Office Action.
U.S. Appl. No. 13/766,781, Dec. 24, 2014, Office Action.
U.S. Appl. No. 13/189,972, May 8, 2015, Office Action.
U.S. Appl. No. 13/616,359, Mar. 31, 2015, Office Action.
U.S. Appl. No. 13/617,270, Apr. 17, 2015, Office Action.
U.S. Appl. No. 13/766,775, May 6, 2015, Office Action.
U.S. Appl. No. 13/766,786, Apr. 8, 2015, Office Action.
U.S. Appl. No. 13/800,946, Apr. 22, 2015, Office Action.
U.S. Appl. No. 14/586,850, Apr. 8, 2015, Office Action.
U.S. Appl. No. 13/725,422, Apr. 8, 2015, Office Action.
U.S. Appl. No. 13/189,972, Oct. 22, 2015, Office Action.
U.S. Appl. No. 13/616,359, Sep. 14, 2015, Notice of Allowance.
U.S. Appl. No. 13/616,380, Aug. 17, 2015, Notice of Allowance.
U.S. Appl. No. 13/617,270, Sep. 24, 2015, Notie of Allowance.
U.S. Appl. No. 13/617,330, Aug. 20, 2015, Office Action.
U.S. Appl. No. 13/617,350, Jul. 27, 2015, Notice of Allowance.
U.S. Appl. No. 13/731,124, Sep. 23, 2015, Office Action.
U.S. Appl. No. 13/766,775, Oct. 23, 2015, Office Action.
U.S. Appl. No. 13/766,781, Jul. 9, 2015, Office Action.
U.S. Appl. No. 13/766,781, Feb. 2, 2016, Office Action.
U.S. Appl. No. 13/766,785, Sep. 9, 2015, Office Action.
U.S. Appl. No. 13/766,786, Oct. 5, 2015, Office Action.
U.S. Appl. No. 13/800,786, Jul. 28, 2015, Office Action.
U.S. Appl. No. 14/586,850, Oct. 20, 2015, Office Action.
U.S. Appl. No. 60/131,822, filed Apr. 29, 1999, "Methods and Apparatus for Association of Packet Protocol Sessions to Switched Circuit Network Connections".
U.S. Appl. No. 13/189,972, Mar. 16, 2016, Office Action.
U.S. Appl. No. 13/617,330, Mar. 3, 2016, Office Action.
U.S. Appl. No. 13/731,124, Mar. 25, 2016, Office Action.
U.S. Appl. No. 13/766,775, Feb. 25, 2016, Office Action.
U.S. Appl. No. 13/766,785, Mar. 9, 2016, Office Action.
U.S. Appl. No. 13/766,786, Apr. 22, 2016, Office Action.
U.S. Appl. No. 13/800,786, Mar. 10, 2016, Office Action.
U.S. Appl. No. 14/586,850, Apr. 28, 2016, Office Action.
U.S. Appl. No. 13/617,330, Aug. 11, 2016, Notice of Allowance.
U.S. Appl. No. 13/800,946, Jul. 7, 2016, Office Action.
U.S. Appl. No. 14/586,850, Jun. 17, 2016, Office Action.
Kuchinskas, Its "DealTime" for Useres With a New Shopping Bot, Jun. 21, 1999, Adweek, http://www.adweek.cominews/advertising/its-dealtime-users-new-shopping-bot-32043.
U.S. Appl. No. 13/189,972, Sep. 23, 2016, Notice of Allowance.
U.S. Appl. No. 13/731,124, Nov. 2, 2016, Office Action.
U.S. Appl. No. 13/766,775, Oct. 5, 2016, Notice of Allowance.
U.S. Appl. No. 13/766,781, Sep. 21, 2016, Office Action.
U.S. Appl. No. 13/766,785, Oct. 26, 2016, Notice of Allowance.
U.S. Appl. No. 13/766,786, Sep. 22, 2016, Office Action.
U.S. Appl. No. 13/800,946, Oct. 6, 2016, Office Action.
U.S. Appl. No. 14/324,959, Oct. 5, 2016, Office Action.
U.S. Appl. No. 14/326,221, Sep. 30, 2016, Office Action.
U.S. Appl. No. 13/731,124, dated Apr. 7, 2017, Notice of Allowance.
U.S. Appl. No. 13/766,779, dated May 3, 2017, Notice of Allowance.
U.S. Appl. No. 13/766,781, dated Feb. 24, 2017, Office Action.
U.S. Appl. No. 14/586,850, dated Feb. 14, 2017, Office Action.
Wobst, The Advanced Encryption Standard (AES): The Successor of DES, 2001 CHI Publishing Ltd., Mar. 2001. http://www.facweb.iitkgp.ernet.in/-sourav/AESarticle.pdf.
U.S. Appl. No. 14/324,959, dated May 25, 2017, Office Action.
U.S. Appl. No. 14/326,221, dated May 25, 2017, Office Action.
U.S. Appl. No. 14/586,850, dated Jun. 29, 2017, Office Action.

* cited by examiner

STATE CHANGE ALERTS MECHANISM

CROSS REFERENCE TO RELATED APPLICATIONS

This application is a continuation of U.S. application Ser. No. 12/615,136 filed on Nov. 9, 2009, which is a continuation of U.S. application Ser. No. 09/624,192 filed on Jul. 24, 2000, which is now U.S. Pat. No. 7,624,172, which claims the benefit of priority to U.S. Provisional Application Ser. No. 60/195,989 filed on Apr. 7, 2000 and U.S. Provisional Application Ser. No. 60/189,974 filed on Mar. 17, 2000. Each of the aforementioned applications and patent are hereby incorporated by reference in their entirety.

TECHNICAL FIELD

The present invention relates generally to delivering information to a client. More particularly, the present invention relates to alerting a client of a state change within an online service.

BACKGROUND

Online service providers are constantly offering new services and upgrading existing services to enhance their subscribers online experience. Subscribers have virtually on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the network of computers that make up the online service.

The proliferation of electronic mail (email) as a means of communication has facilitated the efforts of online service providers to develop and offer additional services to improve subscribers access to information. For example, a subscriber to America Online may register for a service that tracks stock ticker symbols designated by the subscriber and delivers a daily report directly to the subscriber by email at the end of each trading day. The daily report includes daily closing quote data, index quotes, a market news summary, news associated with the company identified by the ticker symbol, and relevant content links.

America Online offers a service that delivers information to a registered subscriber according to the subscribers profile. By setting up a subscriber profile specifying certain categories and/or search words, a registered subscriber can receive a daily newsletter containing articles that pertain to the subscribers profile. A subscriber can also receive a daily listing of Internet or online sites (links) related to the subscribers profiles and can register to receive reminder emails before holidays and/or other special occasions.

America Online also has provided subscribers with the ability to send and receive instant messages. Instant messages are private online conversations between two or more people who have subscribed to the instant messaging service and have installed the necessary software. Because such online conversations take place virtually in real time, instant messaging can provide immediate access to desired information. Instant messaging is fast becoming a preferred means of communicating among online subscribers.

SUMMARY

In one general aspect, a communications system includes one or more alert gates and an alert controller. Each alert gate is configured to detect a different type of alert feed corresponding to a particular type of alert. The alert controller is connected to the alert gates and operable to receive detected alerts from the alert gates and to deliver the detected alerts to a user of the communications system.

The alert controller may be configured to maintain a record of alert types registered for by the user of the communications system. The user may be a subscriber of an instant messaging system. The alert controller may deliver one or more detected alerts to the subscriber through the instant messaging system.

The user also may be a subscriber of an online service provider, and the alert controller may deliver one or more detected alerts to the subscriber through the online service provider. The alert controller may be connected to an instant messaging controller through a routing gateway.

The instant messaging controller and the alert controller may be assigned to the user of the communications system according to a hashing technique. Implementations may include multiple alert controllers.

At least one of the alert gates may detect an alert feed from a remote server by sending a status inquiry to the remote server. The remote server may be a mail server, a stock server, a third party server, a weather server and a news server, and/or a calendar server.

Implementations also may include an alert controller network having multiple alert controllers including the alert controller. The alert controller may be configured to communicate with all alert controllers in the alert controller network.

At least one type of alert feed may contain information related to a group, and the alert controller may be dedicated to receiving information related to certain members of the group. The group may be a group of users, a group of stocks, a group of third parties, and/or a group of cities.

In another general aspect, a user of a communications system is alerted by detecting, at an alert gate, an alert feed corresponding to an alert indicative of a change in state at a remote server; receiving, at an alert controller, detected alerts from the alert gate; and delivering a detected alert to a user of the communications system when the user has indicated a desire to receive the alert.

DESCRIPTION

For illustrative purposes, FIGS. 1-6 describe a communications system for implementing techniques for alerting a client of a state change within an online service. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
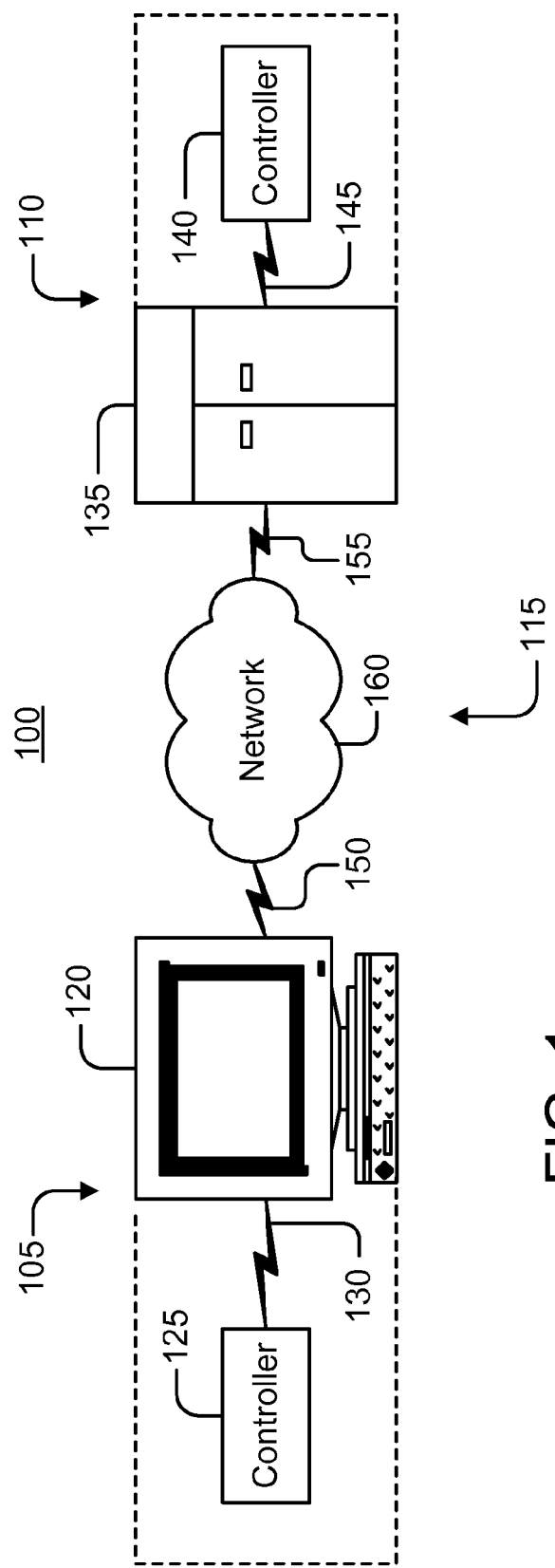
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enables communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
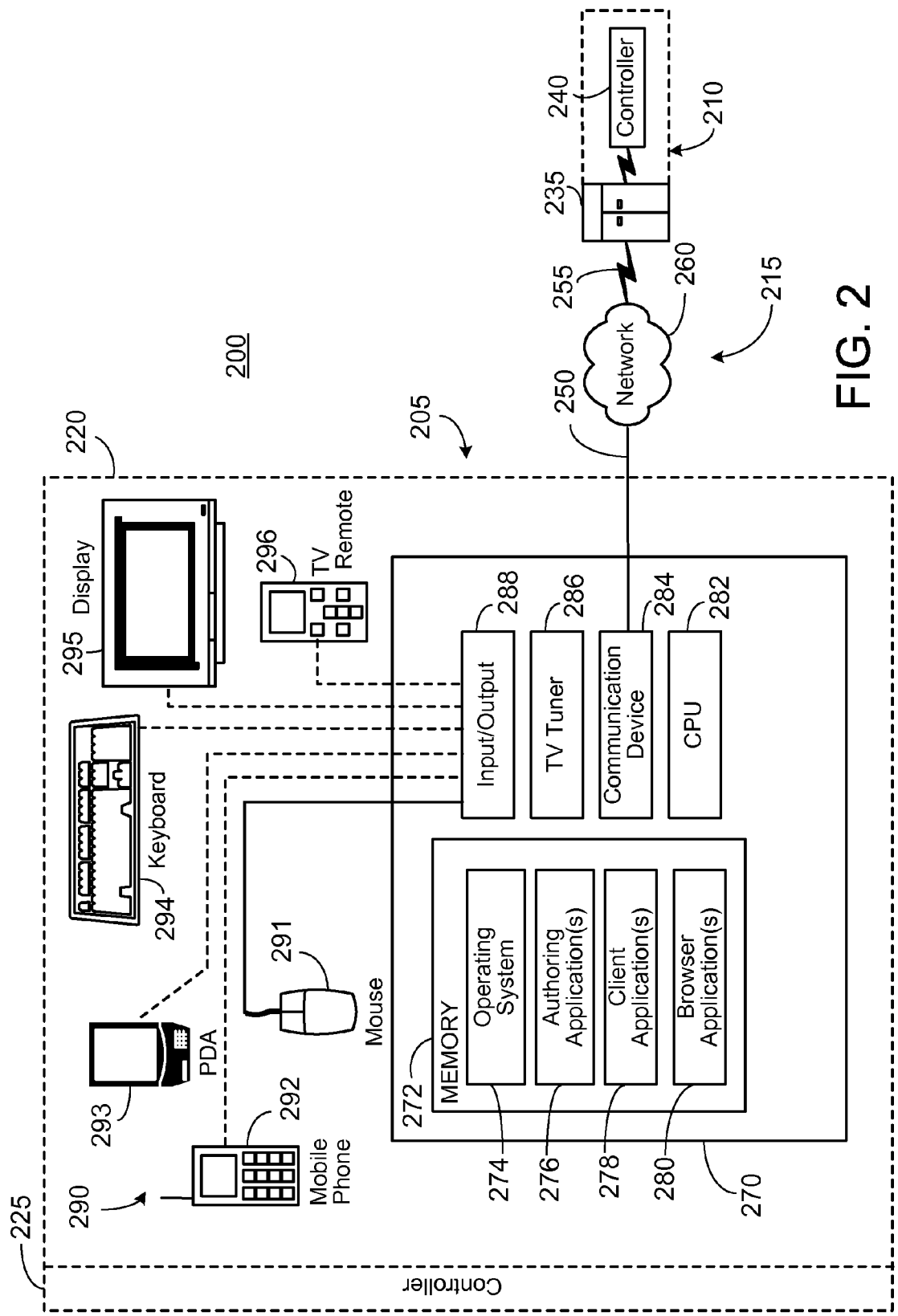
FIGS. 2-6 are expansions of aspects of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
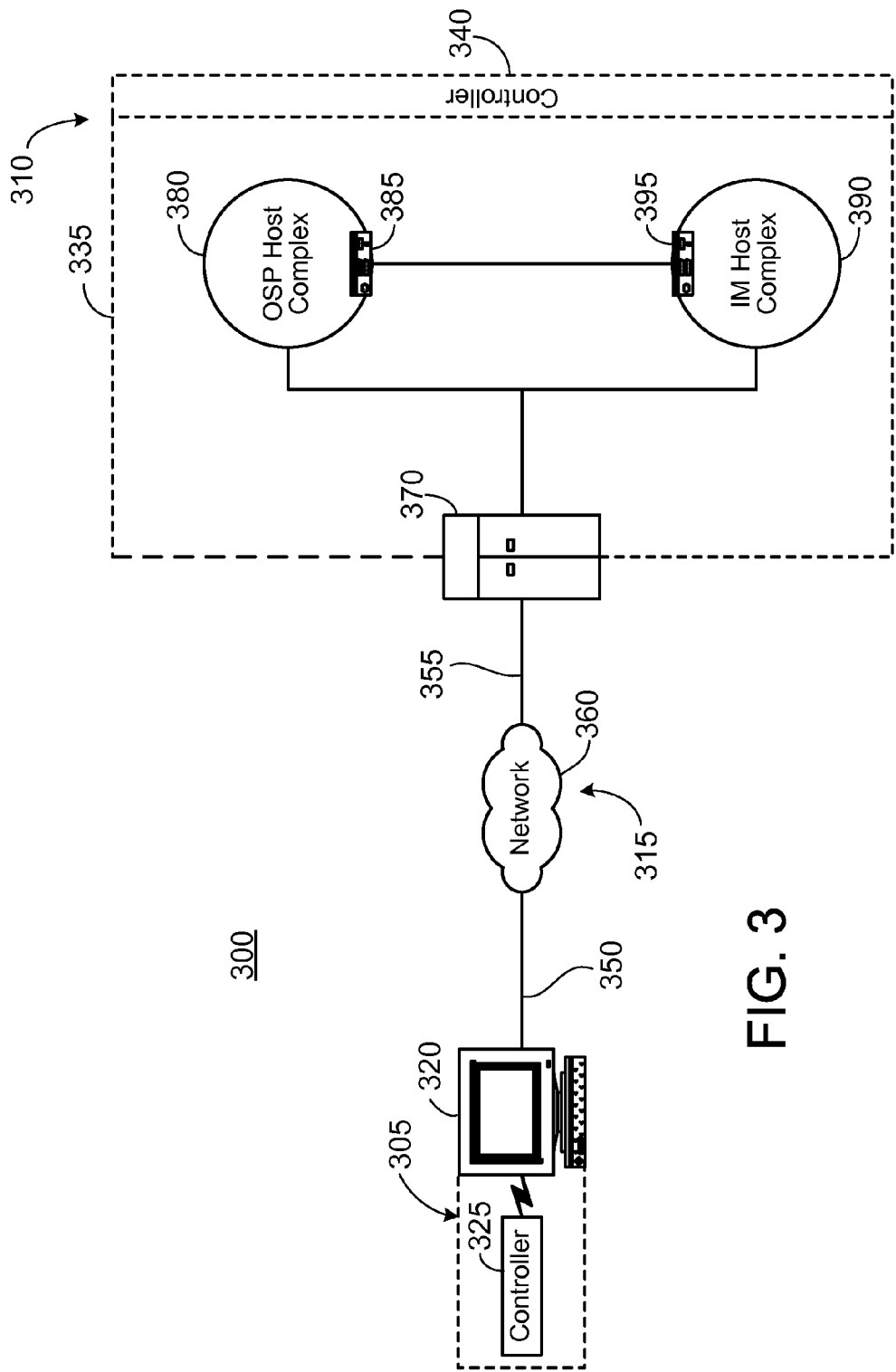

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
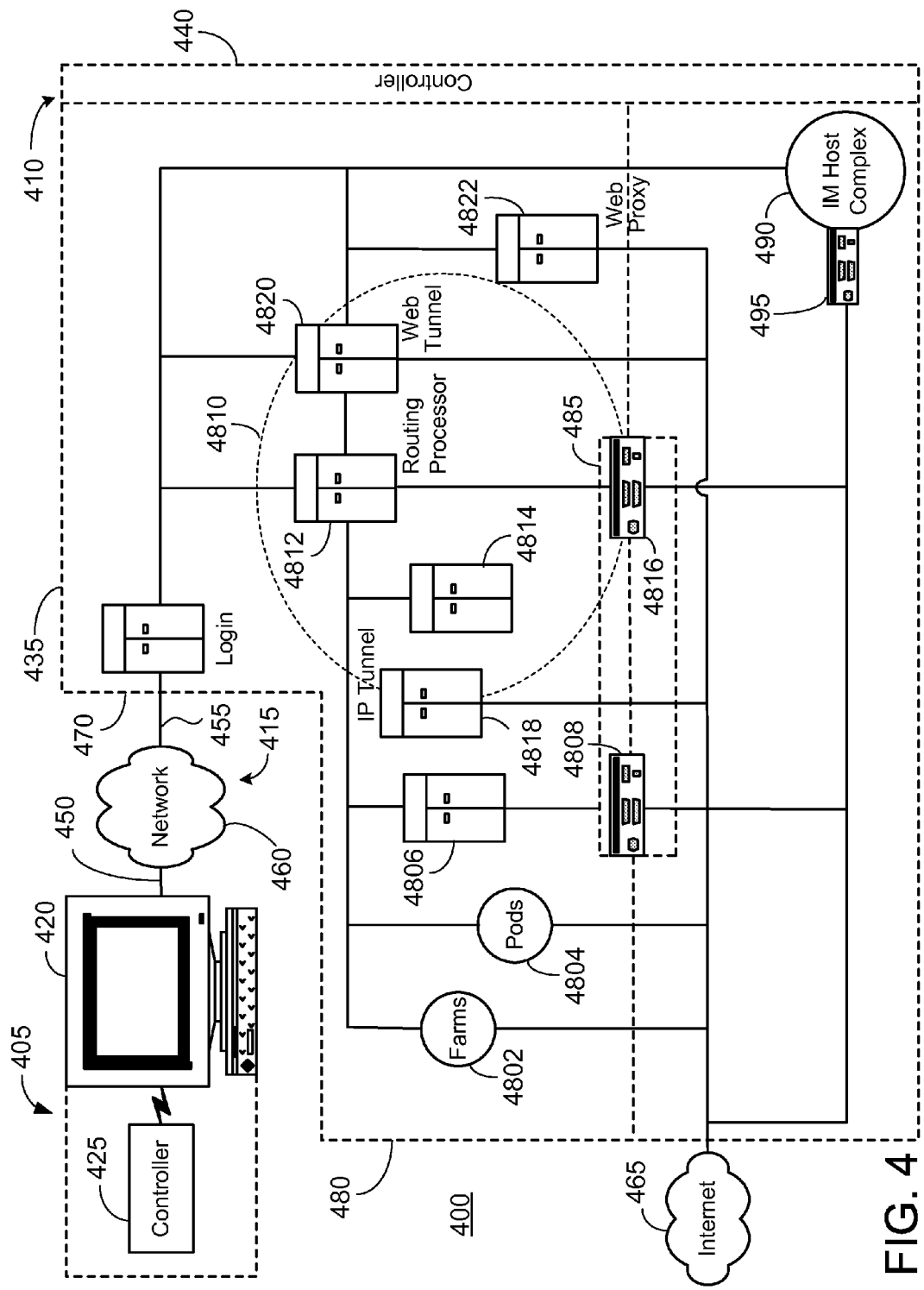

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in large centralized clusters known as farms 4802 or in localized clusters known as pods 4804.

Farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

To reduce the time delays and congestion inherent in centralized processing, some services offered by the OSP host complex 480 are provided from localized servers, generally known as pods 4804. Each pod 4804 includes one or more interrelated servers capable of operating together to provide one or more services offered by the OSP host complex 480 in a geographically localized manner, the servers within a pod 4804 generally operating independently rather than relying on resources external to the pod 4804 to operate. A pod 4804 may cache content received from external sources, such as farms 4802 or the Internet 465, making frequently requested information readily available to local subscribers served by the pod 4804. In this way, pods 4804 are particularly useful in providing services that are independent of other processes and servers such as, for example, routing, keywords, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded servers 4806. In general, the non-podded server 4806 may be dedicated to performing a particular service that relies on other processes and services for information and may be directly or indirectly connected to resources outside of the OSP host complex 480, such as the Internet 465 and the IM host complex 490, through an OSP gateway 4808. In the event that subscriber usage of the particular service is relatively high, the non-podded server 4806 may be included in a farm.

In the implementation of FIG. 4, a pod 4810, shown in more detail, includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or may direct the data request externally to the Internet 465 or the IM host complex 490 through an OSP/pod gateway 4816.

The routing processor 4812 also may direct data requests and/or otherwise facilitate communication between the client system 405 and the Internet 465. In one implementation, the client system 405 uses an OSP client application to convert standard Internet content and protocols into OSP protocols and vice versa. For example, when a browser application transmits a request in standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access the pod 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine the subscriber's parental controls settings and other demographic information. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
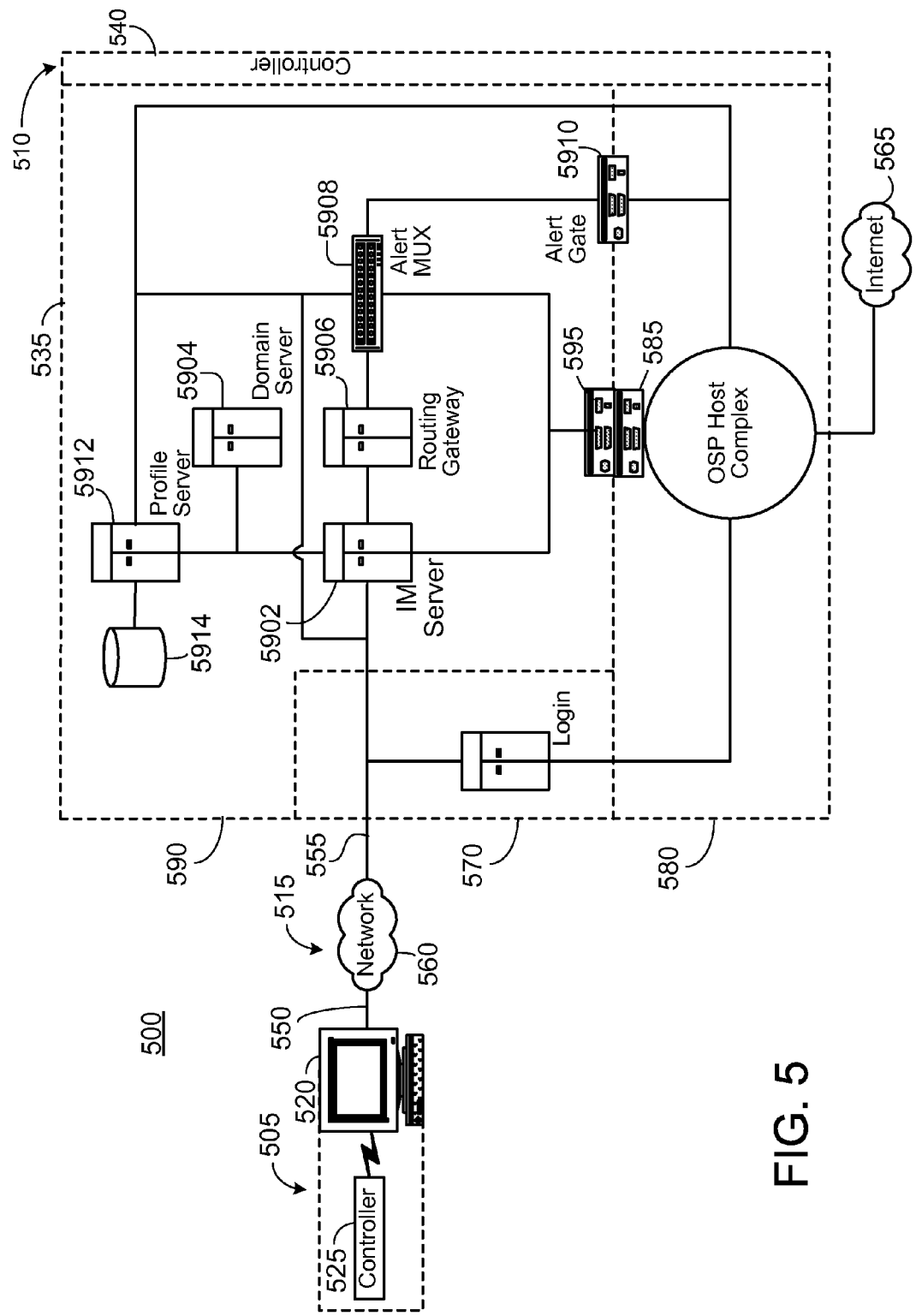

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
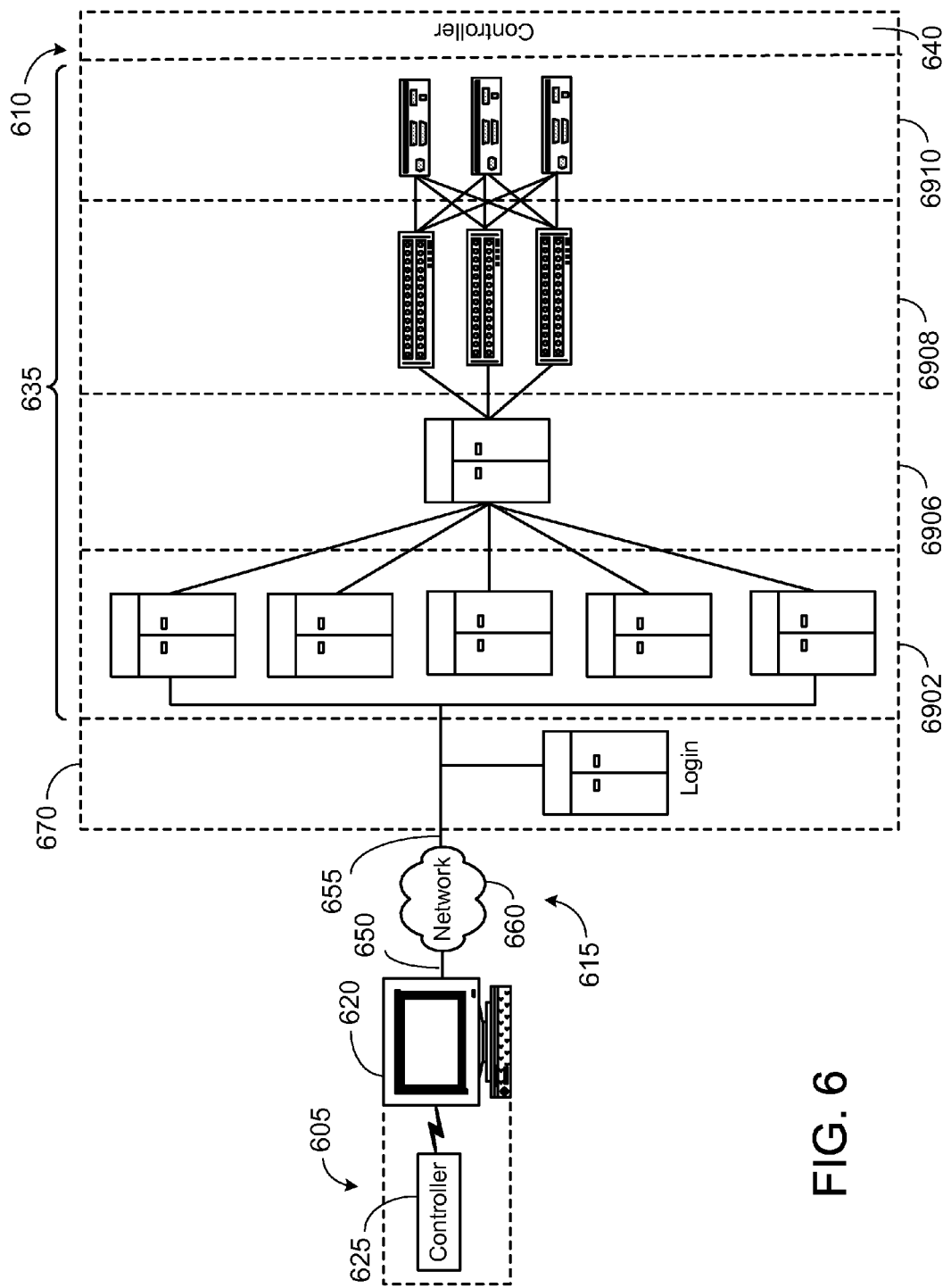

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5. Likewise, the host system 610 of FIG. 6 may have attributes comparable to and illustrates one possible embodiment of the host systems 110, 210, 310, 410 and 510 shown in FIGS. 1-5, respectively. However, FIG. 6 describes an aspect of the host system 610, focusing primarily on one particular implementation of IM host complex 690. For purposes of communicating with the IM host complex 690, the delivery network 660 is generally a telephone network.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications with and authorizing access by client systems 605 to various elements of the host system 610, including the IM host complex 690. The IM host complex 690 includes an IM server network 6902 and an alert multiplexor network 6908. The IM server network 6902 is an interconnected network of IM servers and the alert multiplexor network 6908 is an interconnected network of alert multiplexors. Each IM server and each alert multiplexor can directly or indirectly communicate and exchange information with all of the IM servers in the IM server network 6902 and all of the alert multiplexors in the alert multiplexor network 6908. Each of the alert multiplexors in the alert multiplexor network 6908 is connected to several alert gates 6910 that receive different types of alerts. In the implementation of FIG. 6, the IM server network 6902 and the alert multiplexor network 6908 are interconnected by a routing gateway 6906 that serves as a common hub to reduce the number of connections.

A subscriber typically will be assigned to one IM server in the IM server network 6902 and to one alert multiplexor in the alert multiplexor network 6908 during a session based on one or more hashing techniques. However, the IM servers and the alert multiplexors are capable of storing subscriber information and other electronic content that may be accessed by the other IM servers and alert multiplexors. In one implementation, for example, each IM server in the IM server network 6902 may be dedicated to serving a particular set of registered subscribers. Because all of the IM servers can communicate with each other, all subscribers can communicate with each other through instant messaging. In another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
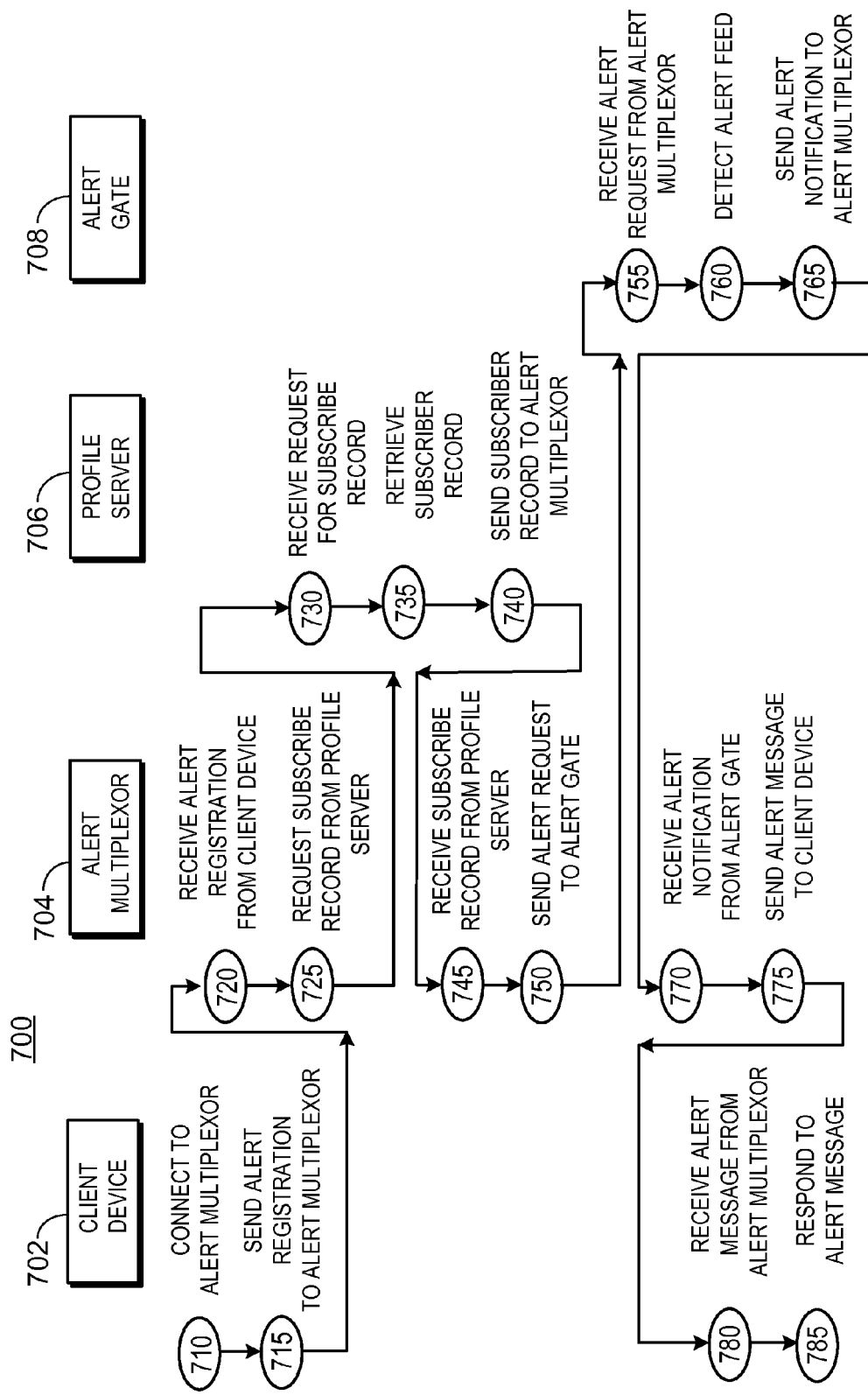
FIG. 7 is a flow chart of a communications method.

Referring to FIG. 7, a client device 702, an alert multiplexor 704, a profile server 706, and an alert gate 708 interact according to a procedure 700 to deliver an alert message to a subscriber. The procedure 700 may be implemented by any type of hardware, software, device, computer, computer system, equipment, component, program, application, code, storage medium, or propagated signal.

Initially, a subscriber may use the client device 702 to connect to the alert multiplexor 704 (step 710). Typically, the client device 702 will include an installed IM client application and will be equipped with a Winsock API that enables the client device 702 to establish an open TCP connection to the alert multiplexor 704. It also may be necessary to perform one or more hashing techniques to identify the alert multiplexor 704 to be used for the subscriber's session.

Once a connection to the alert multiplexor 704 has been established, a subscriber may use the client device 702 to send an alert registration to the alert multiplexor 704 (step 715). The alert registration may inform the alert multiplexor 704 that the subscriber desires to enable the alert capabilities of the alert multiplexor 704. The alert multiplexor 704, in turn, may receive the alert registration from the client device 702 (step 720) and enable the alert capabilities such as, for example, stock alerts, mail alerts, weather alerts, calendar alerts, news alerts, third party alerts, or any other comparable type of alert.

A subscriber may also use the client device 702 to generate a subscriber record that includes the particular types of alerts desired by the subscriber and other alert preferences. The alert preferences may include the conditions for tripping the alerts, the timing of the alerts, and/or the presentation method of the alerts. In general, alert messages may take the form of an instant message, an icon, a pop-up window, and/or an audio alarm that appears during a subscriber's IM session. A subscriber also may choose to receive offline notification of alerts, so that the subscriber may be informed of certain changes in state even when the subscriber is not running the IM client application. For example, a subscriber may set up alert preferences to request notification, for example, by telephone, email, or pager.

In one implementation, an IM client application installed on a client device 702 may generate a URL based on the subscriber record. The URL may specify, for example, the protocol, the site name, and a path that corresponds to the alert preferences. The client device 702 may use a browser application, such as, for example, an embedded HTTP engine in the IM client application, to navigate to the URL to directly or indirectly retrieve data corresponding to particular types of alerts.

Typically, a subscriber will generate a subscriber record during an initial session by interacting with UIs ("User Interfaces") presented on the client device 702. The subscriber record may be stored locally on the client device 702 so that the subscriber does not have to reenter the alert preferences for subsequent sessions unless, of course, the subscriber is using a different client device or desires to change alert preferences. Additionally, the subscriber record may be persistently stored in a centralized database in the host system.

In the event that the subscriber record is stored in a database in the host system, the alert multiplexor 704 may request the subscriber record from the profile server 706 (step 725). The profile server 706 may receive the request for the subscriber record (step 730), retrieve the subscriber record from the database (step 735), and send the subscriber record to the alert multiplexor 704 (step 740).

The alert multiplexor 704 receives the subscriber record from the profile server 706 (step 745) and then communicates with the alert gate 708. In one implementation, the alert multiplexor 704 may send an alert request to the alert gate 708 based on the subscriber record (step 750). Namely, the alert multiplexor 704 may instruct the alert gate 708 to start searching for alert feeds corresponding to any alerts designated in the subscriber record and/or to send alert notifications when an alert feed corresponding to any alerts designated in the subscriber record is detected. The alert gate 708 receives the alert request from the alert multiplexor 704 (step 755) and, in response, searches for and detects alert feeds (step 760).

In another implementation, the alert gate 708 continuously searches for a particular type of alert feed. The alert gate 708 may be loaded with a software program or piece of code that instructs the alert gate 708 to detect a particular alert feed from a remote server, such as, for example, a remote server in an OSP complex or the Internet. The alert feed may correspond to one subscriber or a group of subscribers depending upon load distribution. Typically, the remote server will be loaded with a software program or piece of code that instructs the server to broadcast an alert feed based on some triggering event to one or more specified alert gates. The broadcast of the alert feed may be a continuous or periodic broadcast of the state, may be a broadcast in response to a change in state, or may be a broadcast in response to a status inquiry (e.g., polling). As used herein, state refers to any condition of being that may be represented by the remote server. A change in state can be any updated condition of being and may be internal or external to the remote sever.

Upon detecting the alert feed (step 760), the alert gate 708 may send an alert notification to the alert multiplexor 704 (step 765). The alert notification will inform the alert multiplexor 704 of the alert feed, the condition that triggered the alert feed, and/or the need to contact a particular subscriber. In one implementation, the alert gate 708 may send an alert notification to an alert multiplexor 704 that is associated with a particular subscriber during a session. This is typically the case for alerts relating to personalized information such as, for example, mail alerts and calendar alerts. In another implementation, the alert gate 708 may send an alert notification to an alert multiplexor 704 that that is associated with a particular type of alert. This is generally the case for alerts relating to information of interest to a large number of subscribers, such as, for example, stock alerts, weather alerts, news alerts, and third party alerts.

Typically, the alert multiplexor 704 will be loaded with a software program or piece of code for instructing the alert multiplexor 704 to receive and/or retrieve messages from the alert gate 708. The alert multiplexor 704 may be set to continuously or periodically receive and/or retrieve messages the alert gate 708. The alert multiplexor 704 may receive the alert notification from the alert gate 708 (step 770), and may then determine whether the alert notification corresponds to an alert of interest to a registered subscriber. In the event that a subscriber has requested notification about the particular alert feed, the alert multiplexor 704 sends an alert message to the client device 702 of the registered subscriber (step 775). If the subscriber has requested offline notification about the particular alert, the alert multiplexor 704 may send an alert message to the appropriate offline device of the subscriber. The alert message may contain information about the alert feed and/or the condition that triggered the alert feed. The alert multiplexor 704 alone or in conjunction with other servers may perform sorting, prioritizing, or other types of organizational processing on the alert messages so that the client device 702 is notified in an optimal fashion.

The client device 702 receives the alert message from the alert multiplexor 704 (step 780), and then responds to the alert message (step 785). For example, the subscriber may use the client device 702 to generate a response appropriate to the particular alert feed or triggering condition. Alternatively, the client device 702 may respond automatically to particular alert feeds and/or triggering conditions in a defined manner.

Figure 8:
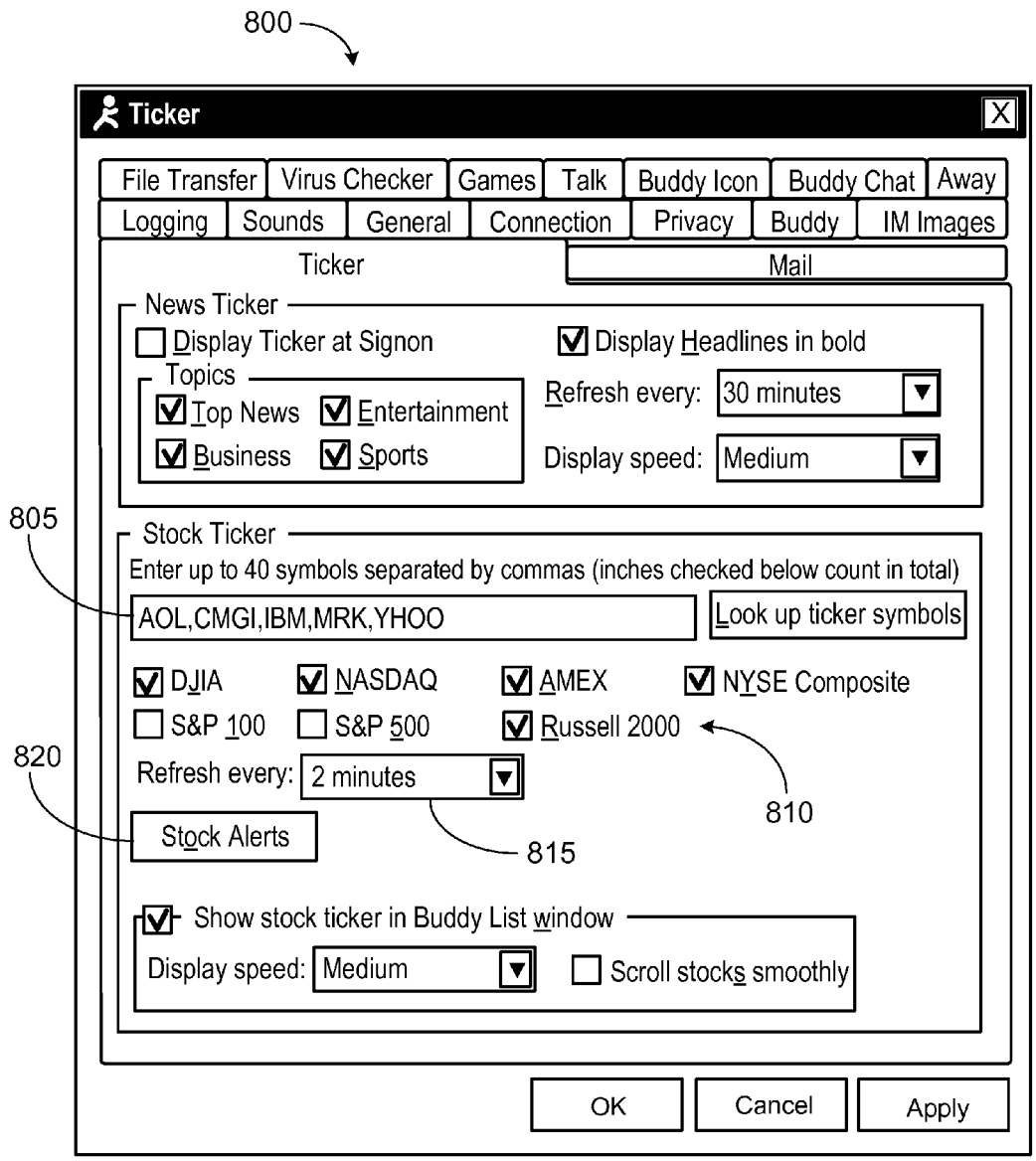
FIGS. 8-14 are illustrations of different graphical user interfaces.
Figure 9:
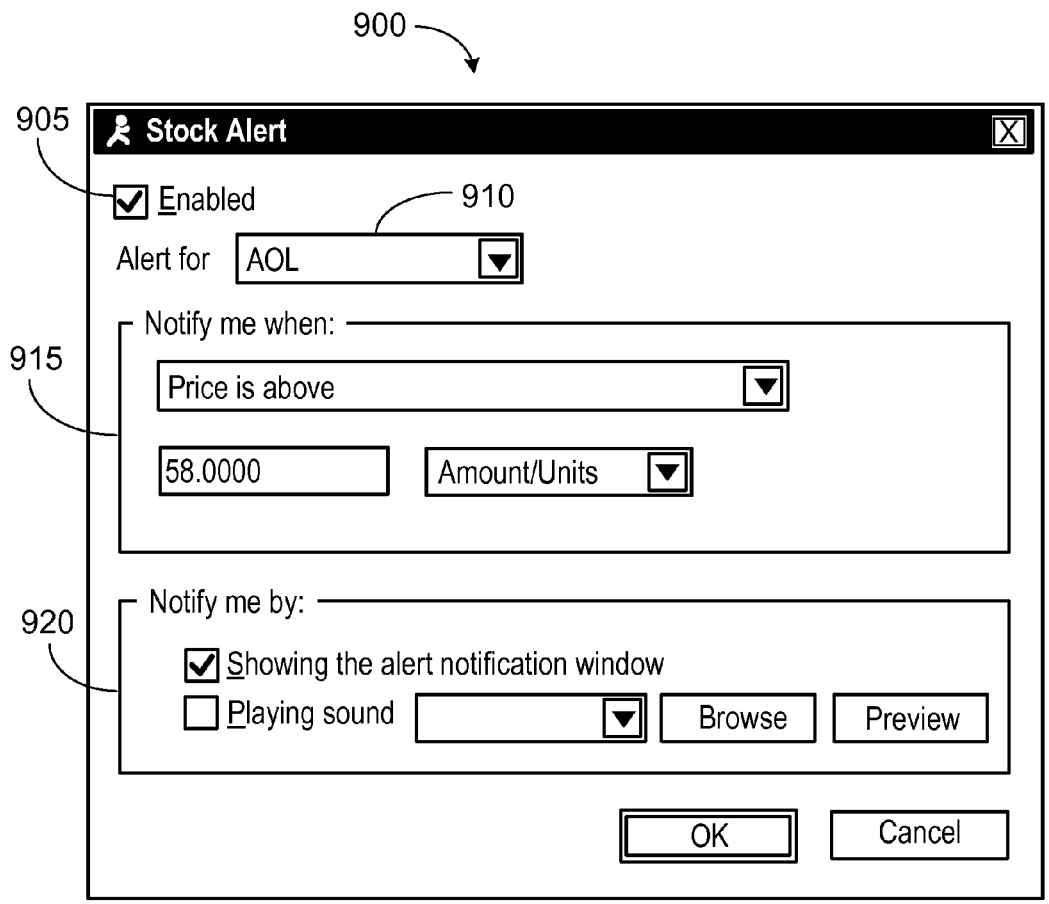
Figure 10:
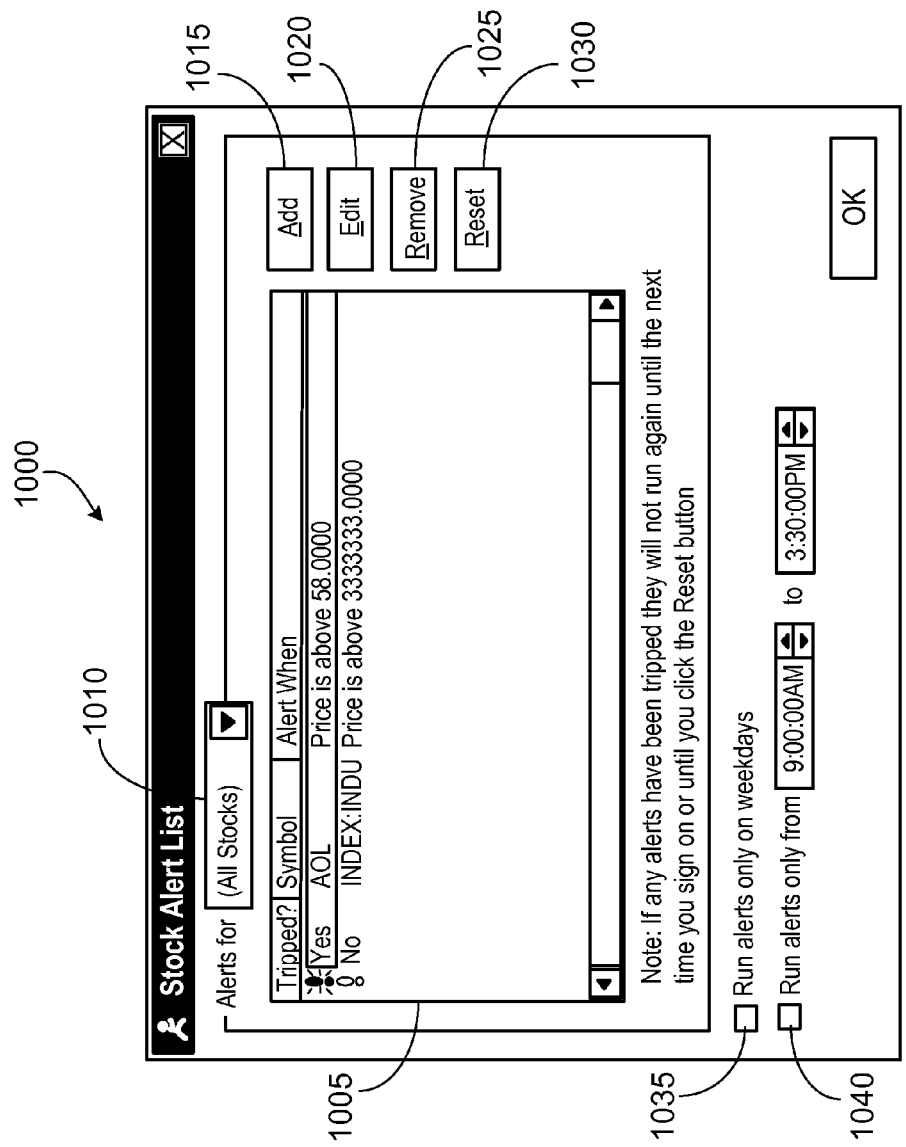

A stock alert is one example of an alert message that may be requested by a subscriber. FIGS. 8-10 illustrate several different UIs that may be used to set a subscriber's stock alert preferences by selecting certain options of and inputting information into the fields of the UIs.

Referring to FIG. 8, a UI 800 may include a ticker symbol field 805 for entering the ticker symbol of one or more stocks to track and an index field 810 for selecting one or more stock indexes to track. The UI also may include a refresh field 815 for designating the interval at which the stock data is updated. The UI 800 may further include a stock alert button 820 for setting and editing stock alert preferences.

Referring to FIG. 9, a UI 900 may include an enabled field 905 for enabling a stock alert for a particular stock and a stock selection field 910 for selecting a particular stock to trip a stock alert message. The UI 900 also may include a notification field 915 for selecting the conditions that trip the stock alert. Typically, a stock alert will be tripped based on price and/or volume, such as, for example, when the price exceeds a certain level, is below a certain level, is above the 52 week high, is below 52 week low, or is above or below a previous close by a certain amount, or when the volume of trading is above or below a certain amount. The UI 900 also may include an alert presentation field 920 for selecting the manner in which an alert message is presented to a subscriber, for example, by showing an alert notification window and/or playing a sound.

Referring to FIG. 10, a UI 1000 may include a display field 1005 for showing whether a stock alert has been tripped, the ticker symbol of the stock, and the conditions that trip the stock alert. The UI 1000 also may include an alert selection field 1010 for selecting which of the stock alerts to display. The UI 1000 may include an add button 1015, an edit button 1020, and a remove button 1025 for adding, editing and removing certain stock alerts and may include a reset button 1030 for resetting a stock alert that has been tripped. The UI 1000 also may include a day selection field 1035 and time selection field 1040 for selecting when to run the stock alerts, for example, only on certain days and/or only at certain times during the day.

Figure 11:
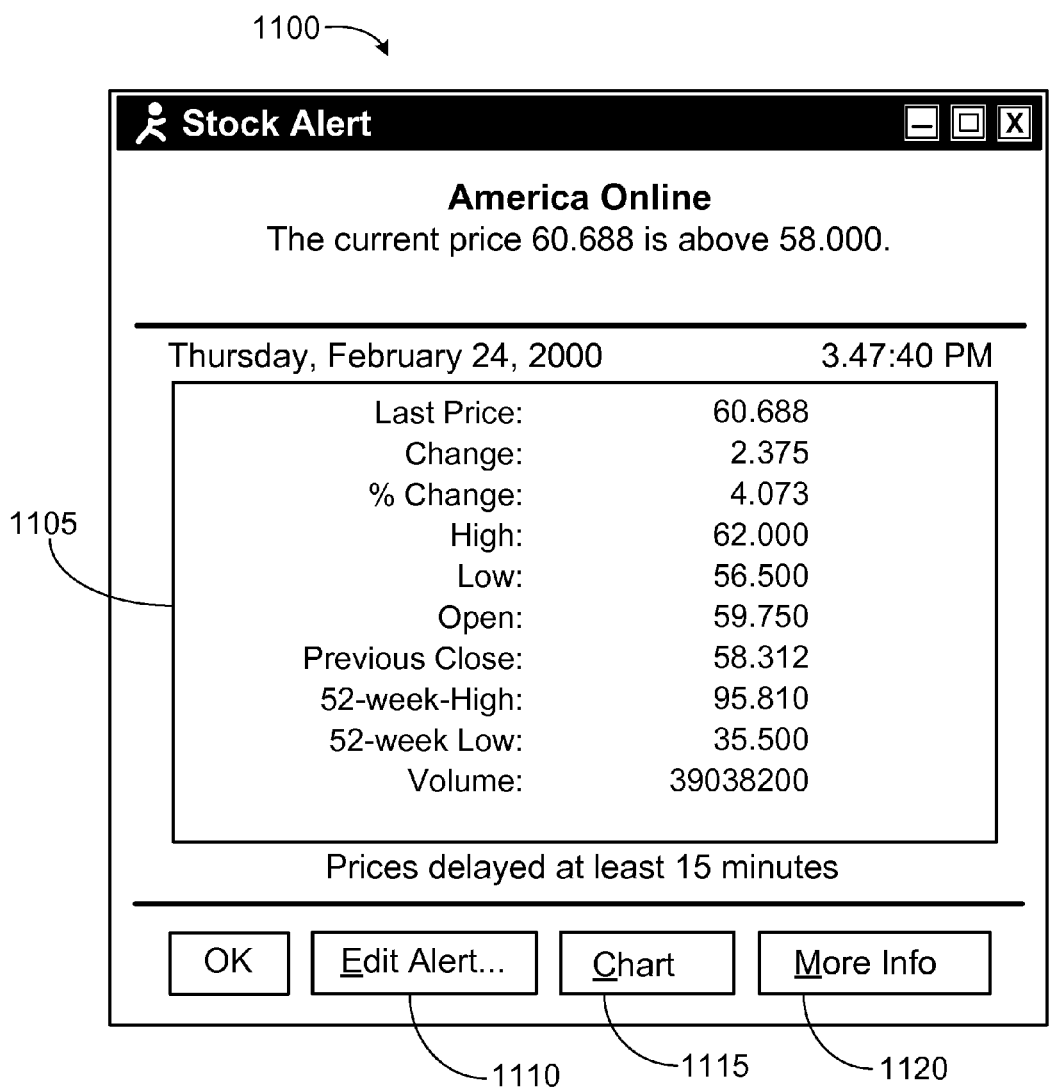

Referring to FIG. 11, a UI 1100 illustrates a stock alert message that may be presented to a subscriber. The stock alert message may be any type of instant message, pop-up window, icon and/or audible alarm capable of getting a subscriber's attention. The stock alert message may include an information field 1105 containing information such as the last price, the dollar change, the percent change, the high, the low, the open, the previous close, the 52 week high, the 52 week low, and/or the trading volume. The UI 1100 also may include an edit button 1110 for editing the presentation of the alert, a chart button 1115 for displaying a stock performance chart, and a more information button 1120 for linking to OSP or Internet websites that provide more detailed information about the particular stock, financial advice, and/or contact information for online or offline stock brokers.

As the stock market fluctuates, a stock alert server, for example, in an OSP host complex or the Internet, broadcasts a stock alert feed to indicate the changing stock prices. The stock alert feed may correspond to one stock, a group of stocks, or all stocks depending upon load distribution. A stock alert gate detects the stock alert feed and then, alone or in conjunction with one or more alert multiplexors, sorts and sends alert notifications to an alert multiplexor network.

Each alert multiplexor in the alert multiplexor network may be dedicated to stock alerts for a certain set of stock ticker symbols and for a certain set of registered subscribers. By communicating with each other, all of the alert multiplexors in the alert multiplexor network have access to information including the complete set of subscribers registered to receive stock alerts, the selected stocks of each registered subscriber, the alert multiplexor and the IM server dedicated to each subscriber during a session, and the alert multiplexors dedicated to the selected stocks. Based on this information, the alert multiplexor network can send, deliver, retrieve, and/or receive stock alert notifications corresponding to all of the stocks selected by all of the registered subscribers and may command the IM client application of each registered subscriber to display an appropriate stock alert message.

Figure 12:
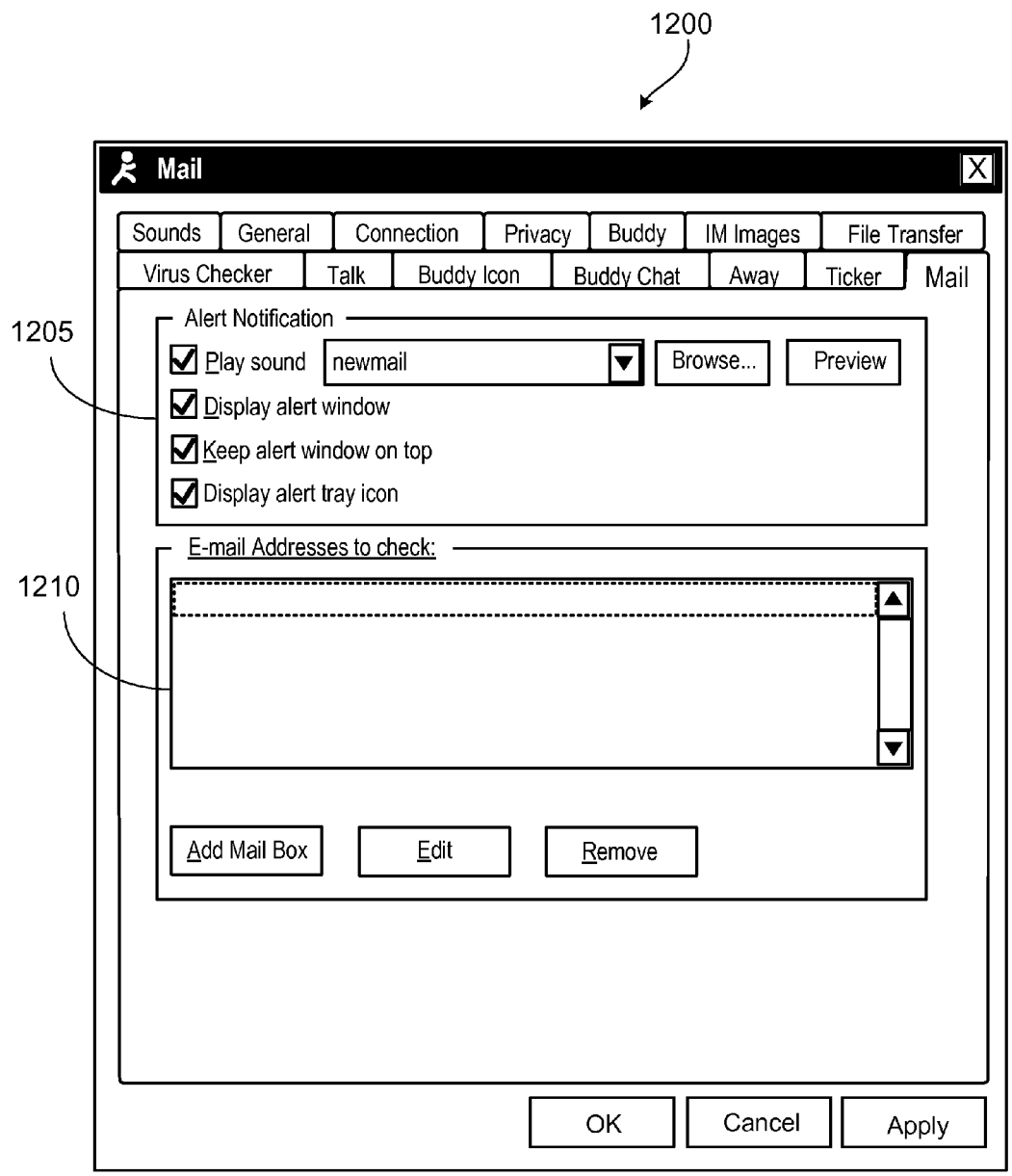
Figure 13:
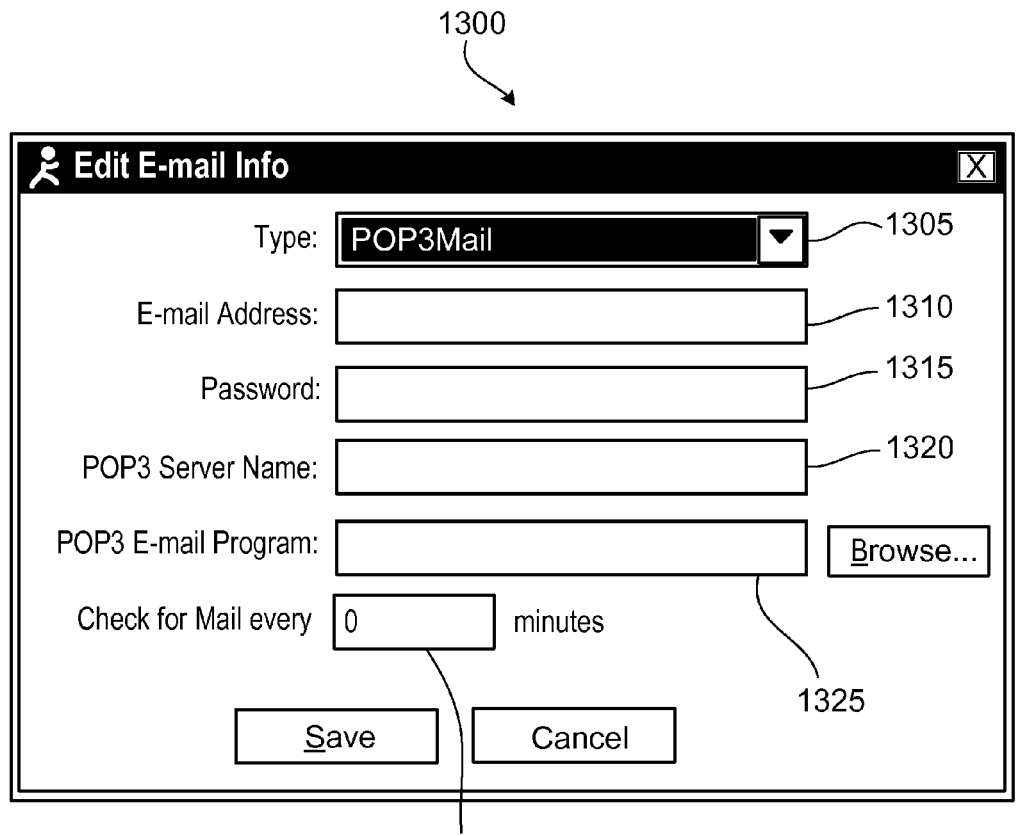

A mail alert is another example of an alert message that may be requested by a subscriber. FIGS. 12 and 13 illustrate different UIs that may be used to set a subscriber's mail alert preferences by selecting certain options and inputting information into the fields of the UIs.

Referring to FIG. 12, a UI 1200 may include an alert notification field 1205 for setting and editing certain mail alert preferences including the manner in which an alert message is presented to a subscriber, for example, by showing an alert notification window and/or playing a sound. The UI 1200 also may include an email address display field 1210 for showing the email addresses that trip a mail alert. The UI 1200 may include an add mail box button 1215, an edit button 1220, and a remove button 1225 for adding, editing and removing email addresses that trip a mail alert.

Referring to FIG. 13, a UI 1300 may include a type field 1305 for entering the type of email account, e.g., a POP3 mail account, and an email address field 1310 for entering the type and address of an email account that trips a mail alert. The UI 1300 also may include a password field 1315 for entering the password to the email account, a server name field 1320 for entering the name of the server for the email account, a program field 1325 for entering the program used to access the email account, and a time field 1330 for entering the interval at which the email account is checked.

Figure 14:
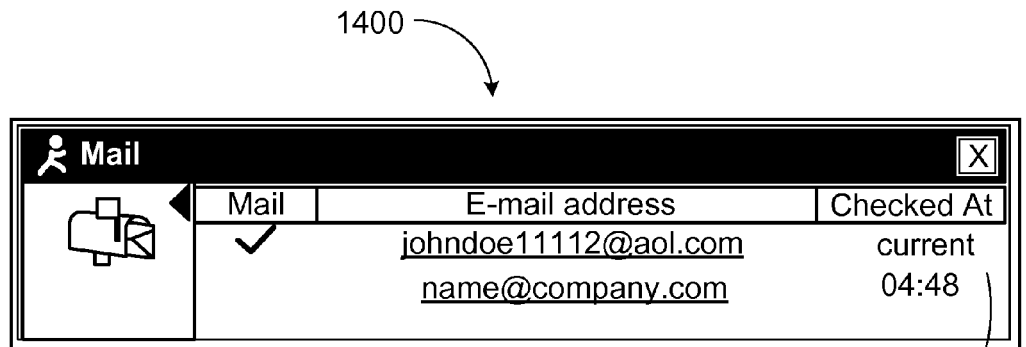

Referring to FIG. 14, a UI 1400 illustrates a mail alert message that may be presented to a subscriber. The mail alert message may be any type of instant message, pop-up window, icon and/or audible alarm capable of getting a subscriber's attention. The mail alert message may include an information field 1405 containing information such as one or more email addresses, whether each of the email address contains unread email, and when the email address was last checked for unread email.

As email messages are received, a mail alert server, for example, in an OSP host complex or the Internet, broadcasts a mail alert feed to indicate changing mail status. The mail alert feed may correspond to one subscriber, a group of subscribers, or all subscribers depending upon load distribution. The mail alert feed is sent to a mail gateway that performs any necessary protocol conversion and then directs the mail alert feed to a mail alert gate.

The mail alert gate detects the mail alert feed and then, alone or in conjunction with one or more alert multiplexors, sorts and sends mail alert notifications to an alert multiplexor network. Each alert multiplexor in the alert multiplexor network may be dedicated to receiving mail alert notifications for a certain set of registered subscribers. Upon receiving a mail alert notification, the alert multiplexor examines whether the mail alert notification corresponds to any of its subscribers. In the event that the alert notification is for one of its subscribers, the alert multiplexor commands the IM client application running on the subscriber's client device to indicate that the subscriber has unread email. Once notified, the subscriber may use the client device to read the email message, typically with an email client application.

Email messages are received and/or stored by a mail server alone or in cooperation with a mail repository. The mail server and mail repository may be part of an OSP host complex or any type of server capable of receiving and/or storing email whether internal or external to the OSP host complex. Email messages may be received and stored from any type of email account including, but not limited to an OSP based email account, an ISP based email account, a Web-based email account, and a POP3 email account.

A third party alert is another example of alert message that may be requested by a subscriber. A third party is broadly understood to include any individual or business entity that provides goods or services. In general, a subscriber may register to receive alerts from one or more third parties that provide a certain category of services. In one implementation, the OSP queries subscribers as to whether they would like to receive various categories of third party alerts. For example, the OSP may partner with various suppliers of computer merchandise and may query subscribers as to whether they would like to receive alerts from any or all third parties that supply computer merchandise. In another implementation, a subscriber may register to receive an alert message at a third party's web site. Once a subscriber has registered to receive the alert, the third party directly or indirectly sends to the subscriber an alert including, for example, a promotional advertisement, a coupon, a notification that an order is done and/or a service is complete, and a message regarding confirmation, cancellation, and/or rescheduling of an appointment.

A weather alert is another example of an alert message that may be requested by a subscriber. In one implementation, a subscriber may register to receive an alert message that informs the subscriber of a weather forecast and/or adverse weather conditions in a particular geographic region.

A calendar alert is another example of an alert message that may be requested by a subscriber. In general, a subscriber may register to receive an alert message that informs the subscriber of important dates, holidays and/or other special occasions. A calendar alert may be provided to a subscriber in any manner as described herein.

A news alert is another example of an alert message that may be requested by a subscriber. In one implementation, a subscriber may register to receive an alert message that informs the subscriber of selected news items or a listing of Internet or online sites (links) related to selected news items. A news alert may be provided to a subscriber in any manner as described herein.

Other embodiments are within the scope of the following claims.

What is claimed is:
1. A method comprising:
receiving a request to receive a particular type of alert from a subscriber of an online communication system, the request comprising one or more time periods for receiving the particular type of alert;
sending data representative of an alert registration to a remote server that searches an alert feed, the alert registration representing the request to receive the particular type of alert and comprising one or more conditions for tripping the particular type of alert;

receiving data representative of an alert sent in response to satisfaction of the one or more conditions for tripping the particular type of alert; and based on the request comprising one or more time periods for receiving the particular type of alert, enabling, using at least one processor, presentation of the alert to the subscriber during the one or more time periods, wherein the alert comprises a link to a resource for accessing additional information associated with the alert.

2. The method of claim 1, further comprising maintaining a subscriber record comprising the alert registration.

3. The method of claim 2, wherein the subscriber record further comprises one or more additional alert registrations, the one or more additional alert registrations representing one or more additional types of alerts and comprising one or more additional conditions for tripping the one or more additional types of alerts.

4. The method of claim 1, wherein receiving data representative of the alert comprises receiving the data from an alert multiplexor.

5. The method of claim 1, wherein receiving data representative of the alert comprises receiving the data from a remote server.

6. The method of claim 1, further comprising enabling presentation of an alert registration user interface to the subscriber.

7. The method of claim 6, further comprising receiving input of the one or more time periods from the subscriber by way of the alert registration user interface.

8. The method of claim 7, further comprising generating the alert registration based at least in part on the input of the one or more time periods.

9. The method of claim 7, wherein the input represents one or more alert preferences.

10. The method of claim 1, wherein enabling presentation of the alert to the subscriber comprises enabling presentation of a message associated with the alert during the one or more time periods.

11. The method of claim 10, wherein enabling presentation of the alert to the subscriber further comprises enabling presentation of an audible alarm during the one or more time periods.

12. The method of claim 10, wherein enabling presentation of the message comprises enabling presentation of the message within a pop-up window during the one or more time periods.

13. The method of claim 1, wherein enabling presentation of the alert comprises enabling presentation of an icon associated with the alert during the one or more time periods.

14. The method of claim 1, wherein the alert comprises a selectable option for accessing the additional information.

15. The method of claim 14, wherein the resource comprises a website including the additional information.

16. The method of claim 14, wherein the additional information comprises contact information associated with the alert.

17. The method of claim 14, wherein the additional information comprises advice associated with the alert.

18. The method of claim 1, further comprising enabling presentation of a selectable option for editing one or more aspects associated with the alert.

19. The method of claim 1, further comprising enabling presentation of a selectable option for displaying a chart associated with the alert.

20. The method of claim 1, wherein the alert comprises a stock alert.

21. The method of claim 1, wherein the alert comprises a calendar alert.

22. The method of claim 1, wherein the alert comprises a mail alert.

23. The method of claim 1, wherein the alert comprises a weather alert.

24. The method of claim 1, wherein the alert comprises a news alert.

25. The method of claim 1, wherein the alert comprises an IM alert.

26. The method of claim 1, wherein the alert comprises an information field.

27. The method of claim 1, wherein the alert is associated with a third-party provider of goods or services.

28. The method of claim 1, wherein the alert is associated with a promotional advertisement.

29. The method of claim 1, wherein the alert is associated with a coupon.

30. The method of claim 1, wherein the alert comprises a notification regarding an order for goods or services.

31. The method of claim 1, wherein the alert comprises a notification regarding an appointment.

32. The method of claim 1, further comprising selectively presenting media content to the subscriber in conjunction with the alert.

33. The method of claim 32, wherein selectively presenting the media content to the subscriber in conjunction with the alert comprises presenting the media content to the subscriber simultaneously with the alert.

34. The method of claim 32, wherein the media content comprises television programming.

35. The method of claim 1, wherein the at least one processor is implemented by a set-top box device.

36. The method of claim 1, wherein the at least one processor is implemented by a mobile device.

37. The method of claim 36, wherein the mobile device comprises a personal digital assistant.

38. The method of claim 36, wherein the mobile device comprises a remote control.

39. The method of claim 36, wherein the mobile device comprises a mobile phone.

40. The method of claim 36, wherein the mobile device includes a touch screen display.

41. The method of claim 1, wherein the alert registration is associated with a particular client application.

42. The method of claim 41, further comprising determining that a client system associated with the subscriber is not currently running the particular client application, wherein enabling presentation of the alert comprises enabling presentation of the alert during the one or more time periods when the client system is not running the particular client application.

43. A method comprising:

receiving a request to receive a particular type of alert from a subscriber of an online communication system, the request comprising one or more time periods for receiving the particular type of alert;

receiving data representative of a change in state associated with an alert registration, wherein the alert registration comprises one or more conditions for tripping the particular type of alert;

determining, using at least one processor, whether the change in state satisfies the one or more conditions for tripping the particular type of alert; and based on the request comprising one or more time periods for receiving the particular type of alert, enabling, in response to a determination that the change in state satisfies the one or more conditions for tripping the particular type of alert, presentation of an alert to the subscriber during the one or more time periods, wherein the alert comprises a link to a resource for accessing additional information associated with the alert.

44. The method of claim 43, wherein receiving the data representative of the change in state comprises receiving the data from a remote server associated with the alert registration during the one or more time periods.

45. The method of claim 43, wherein receiving the data representative of the change in state comprises receiving the data from an alert feed associated with the alert registration during the one or more time periods.

46. The method of claim 43, wherein enabling presentation of the alert to the subscriber comprises enabling presentation of a message to the subscriber during the one or more time periods.

47. The method of claim 46, wherein enabling presentation of the alert to the subscriber further comprises enabling presentation of an audible alarm to the subscriber during the one or more time periods.

48. The method of claim 46, wherein enabling presentation of the message to the subscriber comprises enabling presentation of the message to the subscriber within a pop-up window during the one or more time periods.

49. The method of claim 43, wherein the alert comprises a selectable option for accessing the additional information associated with the alert.

50. The method of claim 49, wherein the resource comprises a website including the additional information.

51. The method of claim 49, wherein the additional information comprises contact information associated with the alert.

52. The method of claim 49, wherein the additional information comprises advice associated with the alert.

53. The method of claim 43, wherein the alert comprises a selectable option for editing one or more aspects associated with the alert.

54. The method of claim 43, wherein the alert comprises a selectable option for displaying a chart associated with the alert.

55. The method of claim 43, wherein the alert comprises a stock alert.

56. The method of claim 43, wherein the alert comprises a calendar alert.

57. The method of claim 43, wherein the alert comprises a mail alert.

58. The method of claim 43, wherein the alert comprises a weather alert.

59. The method of claim 43, wherein the alert comprises a news alert.

60. The method of claim 43, wherein the alert comprises an IM alert.

61. The method of claim 43, wherein the alert comprises an information field.

62. The method of claim 43, wherein the alert is associated with a third-party provider of goods or services.

63. The method of claim 43, wherein the alert comprises a promotional advertisement.

64. The method of claim 43, wherein the alert comprises a coupon.

65. The method of claim 43, wherein the alert comprises a notification regarding an order for goods or services.

66. The method of claim 43, wherein the alert comprises a notification regarding an appointment.

67. The method of claim 43, further comprising selectively presenting media content to the subscriber in conjunction with the alert.

68. The method of claim 67, wherein selectively presenting the media content to the subscriber in conjunction with the alert comprises presenting the media content to the subscriber simultaneously with the alert.

69. The method of claim 67, wherein the media content comprises television programming.

70. The method of claim 43, wherein the at least one processor is implemented by a set-top box device.

71. The method of claim 43, wherein the at least one processor is implemented by a mobile device.

72. The method of claim 71, wherein the mobile device comprises a personal digital assistant.

73. The method of claim 71, wherein the mobile device comprises a remote control.

74. The method of claim 71, wherein the mobile device comprises a mobile phone.

75. The method of claim 71, wherein the mobile device comprises a touch screen display.

76. The method of claim 43, wherein the alert registration is associated with a particular client application.

77. The method of claim 76, further comprising determining that a client system associated with the subscriber is not currently running the particular client application, wherein presenting the alert comprises presenting an offline notification to the subscriber during the one or more time periods in response to the determination that the client system is not currently running the particular client application.

78. A system comprising:

at least one non-transitory computer readable storage medium; and at least one processor programmed to:

receive a request to receive a particular type of alert from a subscriber of an online communication system, the request comprising one or more time periods for receiving the particular type of alert;

send data representative of an alert registration to a remote server that searches an alert feed, the alert registration representing the request to receive the particular type of alert and comprising one or more conditions for tripping the particular type of alert;

receive data representative of a change in state associated with an alert registration, wherein the alert registration comprises one or more conditions for tripping the particular type of alert;

determine whether the change in state satisfies the one or more conditions for tripping the particular type of alert; and based on the request comprising one or more time periods for receiving the particular type of alert, enable, in response to a determination that the change in state satisfies the one or more conditions for tripping the particular type of alert, presentation of an alert to the subscriber during the one or more time periods, wherein the alert comprises a link to a resource for accessing additional information associated with the alert.

79. The system of claim 78, wherein the at least one non-transitory computer readable storage medium stores a subscriber record comprising the alert registration.

80. The system of claim 79, wherein the at least one processor is further programmed to receive the data representative of the change in state from a remote server associated with the alert registration.

81. The system of claim 79, wherein the at least one processor is further programmed to receive the data representative of the change in state from an alert feed associated with the alert registration.

82. The system of claim 78, wherein the alert comprises a message to the subscriber during the one or more time periods.

83. The system of claim 82, wherein the at least one processor is further programmed to enable presentation of an audible alarm to the subscriber during the one or more time periods.

84. The system of claim 82, wherein the at least one processor is further programmed to enable presentation of the message within a pop-up window during the one or more time periods.

85. The system of claim 82, wherein the alert comprises a selectable option for accessing the additional information associated with the alert.

86. The system of claim 85, wherein the resources comprises a website including the additional information.

87. The system of claim 85, wherein the additional information comprises contact information associated with the alert.

88. The system of claim 85, wherein the additional information comprises advice associated with the alert.

89. The system of claim 78, wherein the alert comprises a selectable option for editing one or more aspects associated with the alert.

90. The system of claim 78, wherein the alert comprises a selectable option for displaying a chart associated with the alert.

91. The system of claim 78, wherein the alert comprises a stock alert.

92. The system of claim 78, wherein the alert comprises a calendar alert.

93. The system of claim 78, wherein the alert comprises a mail alert.

94. The system of claim 78, wherein the alert comprises a weather alert.

95. The system of claim 78, wherein the alert comprises a news alert.

96. The system of claim 78, wherein the alert comprises an IM alert.

97. The system of claim 78, wherein the alert comprises an information field.

98. The system of claim 78, wherein the alert is associated with a third-party provider of goods or services.

99. The system of claim 98, wherein the alert comprises a promotional advertisement.

100. The system of claim 98, wherein the alert comprises a coupon.

101. The system of claim 98, wherein the alert comprises a notification regarding an order for goods or services.

102. The system of claim 98, wherein the alert comprises a notification regarding an appointment.

103. The system of claim 78, wherein the at least one processor is further programmed to selectively present media content to the subscriber in conjunction with the alert.

104. The system of claim 103, wherein selectively presenting the media content to the subscriber in conjunction with the alert comprises presenting the media content to the subscriber simultaneously with the alert.

105. The system of claim 104, wherein the media content comprises television programming.

106. The system of claim 78, wherein the system is a set-top box device.

107. The system of claim 78, wherein the system is a mobile device.

108. The system of claim 107, wherein the mobile device comprises a personal digital assistant.

109. The system of claim 107, wherein the mobile device comprises a remote control.

110. The system of claim 107, wherein the mobile device comprises a mobile phone.

111. The system of claim 110, further comprising a touch screen display.

112. The system of claim 78, wherein the alert registration is associated with a particular client application.

113. The system of claim 112, wherein the at least one processor is further programmed to determine that the system is not currently running the particular client application, wherein the at least one processor is further programmed to present the alert during the one or more time periods when the system is not running the particular client application.

* * * * *